US012151560B2

(12) United States Patent
Miyake et al.

(10) Patent No.: US 12,151,560 B2
(45) Date of Patent: Nov. 26, 2024

(54) SUPERIMPOSED IMAGE DISPLAY DEVICE

(71) Applicant: AISIN CORPORATION, Aichi (JP)

(72) Inventors: Hiroyuki Miyake, Kariya (JP);
Daisuke Kobayashi, Kariya (JP)

(73) Assignee: AISIN CORPORATION, Aichi (JP)

( * ) Notice: Subject to any disclaimer, the term of this patent is extended or adjusted under 35 U.S.C. 154(b) by 223 days.

(21) Appl. No.: 17/975,798

(22) Filed: Oct. 28, 2022

(65) Prior Publication Data

US 2023/0135641 A1 May 4, 2023

(30) Foreign Application Priority Data

Oct. 29, 2021 (JP) ................................. 2021-177446

(51) Int. Cl.
*B60K 35/00* (2024.01)
*G06V 20/56* (2022.01)
*B60K 35/23* (2024.01)
*B60K 35/28* (2024.01)

(52) U.S. Cl.
CPC ............ *B60K 35/00* (2013.01); *G06V 20/588* (2022.01); *B60K 35/23* (2024.01); *B60K 35/28* (2024.01); *B60K 2360/166* (2024.01); *B60K 2360/176* (2024.01)

(58) Field of Classification Search
CPC ........ B60K 35/00; B60K 35/23; B60K 35/28; B60K 2360/166; B60K 2360/176; B60K 2360/177; G06V 20/588
See application file for complete search history.

(56) References Cited

U.S. PATENT DOCUMENTS

2017/0343374 A1\* 11/2017 Yi ........................ G06V 20/588

FOREIGN PATENT DOCUMENTS

| JP | 2014-048146 A | 3/2014 |
| JP | 2017-032440 A | 2/2017 |

\* cited by examiner

*Primary Examiner* — Yuen Wong
(74) *Attorney, Agent, or Firm* — Sughrue Mion, PLLC

(57) ABSTRACT

A superimposed image display device is configured to: acquire a recommended lane in which a vehicle is recommended to travel on a road on which the vehicle is currently traveling; identify a lane of travel that is a lane in which the vehicle is currently traveling on the road on which the vehicle is currently traveling; acquire a confidence indicating how confident an identification result of the lane of travel is; and display a guide object providing guidance on the recommended lane in a display mode according to the confidence.

10 Claims, 17 Drawing Sheets

FIRST GUIDE OBJECT (FIRST DISPLAY MODE)

FIRST GUIDE OBJECT (SECOND DISPLAY MODE)

FIRST GUIDE OBJECT (THIRD DISPLAY MODE)

SUPERIMPOSED IMAGE DISPLAY DEVICE

INCORPORATION BY REFERENCE

This application claims the benefit of priority from Japanese Patent Application No. 2021-177446 filed on Oct. 29, 2021, of which the specification, drawings and abstract are incorporated herein by reference in their entirety.

BACKGROUND OF THE DISCLOSURE

The present disclosure relates to superimposed image display devices that assist in driving a vehicle.

Description of the Related Art

Conventionally, various units are used as an information providing unit for providing various kinds of information that assist in driving a vehicle, such as route guidance and warnings against obstacles, to a vehicle occupant. Examples of such an information providing unit include display on a liquid crystal display installed in a vehicle and voice that is output from a speaker. Devices that provide information by displaying an image superimposed on the surrounding environment of a vehicle occupant (landscape or actual view) have been recently used as one of such an information providing unit. For example, there is a method in which an image is displayed superimposed on a captured image of the surroundings of a vehicle displayed on a liquid crystal display, in addition to a head-up display or a windshield display.

For example, Japanese Unexamined Patent Application Publication No. 2014-48146 (JP 2014-48146 A) discloses a technique of providing guidance particularly on a recommended lane, namely a lane in which a vehicle should travel, by displaying an image superimposed on the surrounding environment of a vehicle occupant. In the technique disclosed in JP 2014-48146 A, an captured image of the landscape in front of a vehicle is displayed on a display unit, and when the remaining distance to an intersection is greater than a reference value and the vehicle is not traveling in a recommended lane, namely a lane recommended for the vehicle to pass through the intersection, an image of an arrow is displayed superimposed on the recommended lane included in the landscape in front of the vehicle in order to notify a vehicle occupant of the position of the recommended lane.

SUMMARY OF THE DISCLOSURE

However, in order to provide guidance on the recommended lane by superimposing an image on the road surface of the recommended lane as disclosed in JP 2014-48146 A (FIG. 5), it is necessary that the position of the recommended lane as viewed from the vehicle (i.e., on which side of and how far from the lane in which the vehicle is currently traveling the recommended lane is located) have been identified. In order to identify the position of the recommended lane as viewed from the vehicle, it is necessary to accurately identify the lane in which the vehicle is currently traveling (hereinafter also referred to as the "lane of travel").

In the technique disclosed in JP 2014-48146 A (FIG. 5), image recognition is used as a unit for identifying the lane of travel. Specifically, lane lines are detected by performing image recognition on an image of the area in front of the vehicle captured by a camera, and the lane of travel is identified based on the detection results. However, the identification result of the traveling line may not be confident when, for example, the weather is bad or when the painted lane lines are faded. In JP 2014-48146 A (FIG. 5), even when the identification result of the lane of travel is not confident, guidance is provided by superimposing an image on the road surface of the recommended lane. Accordingly, wrong guidance may be provided, which may cause a disadvantage to the vehicle occupant.

The aspects of the disclosure were made to solve the above conventional problem, and it is an aspect of the present disclosure to provide a superimposed image display device that, when providing guidance on a recommended lane using a guide object displayed superimposed on the landscape around a vehicle, displays the guide object in a display mode according to the confidence of the identification result of a lane of travel, and thus reduces or eliminates the possibility that a disadvantage may be caused to a vehicle occupant even when the confidence is low.

In order to achieve these aspects, the superimposed image display device according to a first aspect of the present disclosure is a superimposed image display device that is mounted on a vehicle and that superimposes a guide object providing guidance on information to an occupant of the vehicle on a landscape around the vehicle to allow the occupant to see the guide object. The superimposed image display device includes: a recommended lane acquisition unit that acquires a recommended lane in which the vehicle is recommended to travel on a road on which the vehicle is currently traveling; a lane-of-travel identification unit that identifies a lane of travel, the lane of travel being a lane in which the vehicle is currently traveling on the road on which the vehicle is currently traveling; a confidence acquisition unit that acquires a confidence indicating how confident an identification result of the lane of travel by the lane-of-travel identification unit is; and an object display unit that displays the guide object providing guidance on the recommended lane in such a manner that the guide object is superimposed on a road surface, based on the lane of travel and the recommended lane. The object display unit displays the guide object in a display mode according to the confidence.

As used herein, the "landscape" includes not only a landscape (actual view) that is actually seen from a vehicle, but also a captured image of the landscape, and a reproduced image of the landscape.

The "guidance on the recommended lane" may be guidance that makes the vehicle aware of the position and direction of the recommended lane with no purpose of guiding the vehicle to the recommended lane, or may be guidance that guides the vehicle to the recommended lane.

According to the superimposed image display device of the first aspect of the present disclosure having the above configuration, when providing guidance on the recommended lane using the guide object displayed superimposed on the landscape around the vehicle, the superimposed image display device displays the guide object in a display mode according to the confidence of the identification result of the lane of travel. This allows accurate guidance to be provided when the confidence is high, and reduces or eliminates the possibility that a disadvantage may be caused to the vehicle occupant even when the confidence is low.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF THE EMBODIMENTS

Hereinafter, first and second embodiments in which a superimposed image display device according to the present disclosure is embodied as a navigation device will be described in detail with reference to the drawings.

First Embodiment

Figure 1:
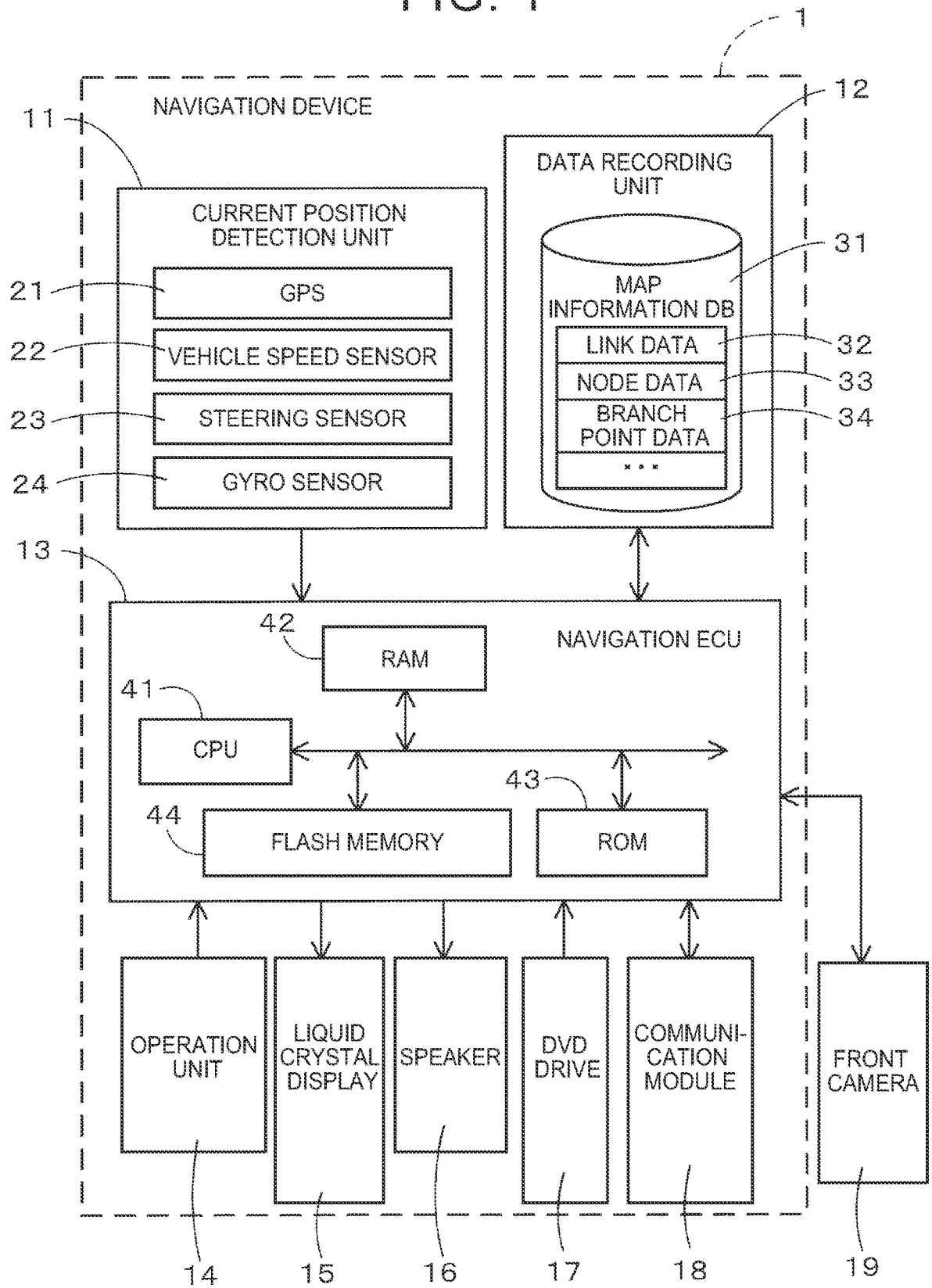
FIG. 1 is a block diagram of a navigation device according to a first embodiment.

First, a schematic configuration of a navigation device 1 according to the first embodiment will be described with reference to FIG. 1. FIG. 1 is a block diagram of the navigation device 1 according to the first embodiment.

As shown in FIG. 1, the navigation device 1 according to the first embodiment includes: a current position detection unit 11 that detects the current position of a vehicle equipped with the navigation device 1; a data recording unit 12 having various kinds of data recorded thereon; a navigation electronic control unit (ECU) 13 that performs various arithmetic operations based on input information; an operation unit 14 that receives operations from a user; a liquid crystal display 15 that displays a captured image of an actual view of the area located in front of the user in the direction of travel; a speaker 16 that outputs voice guidance for route guidance; a digital versatile disc (DVD) drive 17 that reads a DVD as a storage medium; and a communication module 18 that communicates with an information center such as a probe center or Vehicle Information and Communication System (VICS, registered trademark) Center. A front camera 19 and various sensors that are mounted on the vehicle equipped with the navigation device 1 are connected to the navigation device 1 via an in-vehicle network such as Controller Area Network (CAN).

Each component of the navigation device 1 will be described below.

The current position detection unit 11 includes a Global Positioning System (GPS) 21, a vehicle speed sensor 22, a steering sensor 23, and a gyro sensor 24, and can detect the current vehicle position, vehicle orientation, vehicle speed, current time, etc. In particular, the vehicle speed sensor 22 is a sensor that detects the travel distance and speed of the vehicle. The vehicle speed sensor 22 generates pulses as drive wheels of the vehicle rotate, and outputs the pulse signal to the navigation ECU 13. The navigation ECU 13 calculates the rotational speed of the drive wheels and the travel distance by counting the generated pulses. The navigation device 1 need not necessarily include all of the above four types of sensors. The navigation device 1 may include only one or more of the four types of sensors.

The data recording unit 12 includes: a hard disk (not shown) as an external storage device and recording medium; and a recording head (not shown) that is a driver for reading a map information database (DB) 31, predetermined program, etc. recorded on the hard disk and writing predetermined data to the hard disk. The data recording unit 12 may include a flash memory, a memory card, or an optical disc such as compact disc (CD) or DVD, instead of the hard disk. The map information DB 31 may be stored in an external server, and the navigation device 1 may acquire the map information DB 31 from the external server through communication.

The map information DB 31 is a storage unit having stored therein, for example, link data 32 regarding roads (links), node data 33 regarding node points, branch point data 34 regarding branch points, point data regarding points such as facilities, map display data for displaying a map, search data for searching for a route, and search data for searching for a point.

The following data is recorded as the link data 32: data on each link forming a road, data on a corner, data on a road, data on road attributes, and data on the road type. The data on each link forming a road includes data indicating width, slope, cant, bank, road surface condition, number of lanes of the road, direction of travel of each lane, whether there is any oncoming lane (whether it is a two-way traffic section), location where the number of lanes decreases, location where the road narrows, railroad crossing, etc. The data on a corner includes data indicating radius of curvature, intersection, T-intersection, entrance and exit of the corner, etc. The data on road attributes include data indicating a downhill road, an uphill road, etc. The data on the road type include data indicating an expressway and a local road (national road, prefectural road, narrow street, etc.).

The following data is recorded as the node data 33: coordinates (position) of each branch point (including an intersection, a T-intersection, etc.) on an actual road or each node point set on each road at every predetermined distance according to the radius of curvature etc., node attributes indicating whether the node is a node corresponding to an intersection etc., a connection link number list that is a list of link numbers of links that connect to the node, an adjacent node number list that is a list of node numbers of nodes that are adjacent to the node via links, height (altitude) of each node point, etc.

The following data is recorded as the branch point data 34: name of an intersection of the branch point, relevant node information identifying the node forming the branch point, connection link information identifying the link connected to the branch point, name of the direction corresponding to the link connected to the branch point, information identifying the shape of the branch point, etc. Structures that can serve as landmarks when providing guidance on a right or left turn at the branch point are also stored.

The navigation ECU 13 is an electronic control unit that controls the entire navigation device 1. The navigation ECU 13 includes: a central processing unit (CPU) 41 as an arithmetic device and a control device; and an internal storage device such as a random access memory (RAM) 42 that is used as a working memory when the CPU 41 performs various arithmetic operations and that stores route data etc. when route search is performed, a read-only memory (ROM) 43 having stored therein, for example, a driving assistance processing program (FIG. 2) that will described later in addition to a control program, and a flash memory 44 that stores a program read from the ROM 43. The navigation ECU 13 includes various units as processing algorithms. For example, a recommended lane acquisition unit acquires a recommended lane in which the vehicle is recommended to travel on a road on which the vehicle is currently traveling. A lane-of-travel identification unit identifies a lane of travel that is a lane in which the vehicle is currently traveling on the road on which the vehicle is currently traveling. A confidence acquisition unit acquires the confidence indicating how confident the identification result of the lane of travel by the lane-of-travel identification unit is. An object display unit displays a guide object that provides guidance on the recommended lane based on the lane of travel and the recommended lane.

The operation unit 14 is operated when entering a departure point as a travel start point and a destination as a travel end point, and includes a plurality of operation switches (not shown) such as various keys and buttons. The navigation ECU 13 performs control to execute various corresponding operations based on switch signals output in response to depression etc. of the switches. The operation unit 14 may include a touch panel mounted on the front of the liquid crystal display 15. The operation unit 14 may include a microphone and a voice recognition device.

The liquid crystal display 15 displays a map image including roads, traffic information, operation guidance, an operation menu, guidance on the keys, a guide route from the departure point to the destination, guide information on the guide route, news, a weather forecast, time, emails, a television program, etc. Particularly in the first embodiment, when the vehicle approaches a guide branch point, an image captured by the front camera 19, that is, a current landscape (image of a current actual view) around the vehicle (particularly in front of the vehicle), is displayed on the liquid crystal display 15, and as necessary, the guide object is displayed superimposed on the landscape on the liquid crystal display 15.

The guide object displayed superimposed on the landscape includes information on the vehicle and various kinds of information that are used to assist a vehicle occupant in driving. Examples of the guide object include: warnings or alerts against objects against which the vehicle occupant is to be warned or alerted (other vehicles, pedestrians, and guide signs); a guide route set in the navigation device 1 and guidance information based on the guide route (arrows indicating right and left turn directions, an icon marking the guide branch point, distance to the guide branch point, position of the recommended lane and direction toward the recommended lane to which the vehicle travels, guidance encouraging to change lanes to the recommended lanes, etc.); warnings or alerts to be displayed on the road surface (frequent collision areas, speed limits, etc.); lane lines of the lane in which the vehicle travels; current vehicle speed; shift position; remaining energy; advertising images; facility information; guide signs; map image; traffic information; news; weather forecast; time; and screen of a connected smartphone. In the first embodiment described below, the guide object is guide information that provides guidance on a guide branch point located ahead in the direction of travel of the vehicle. More specifically, the guide object is an arrow indicating the exit direction at the guide branch point along the guide route, a guide image indicating the position and direction of a recommended lane in which the vehicle is recommended to travel on the road on which the vehicle is currently traveling in order to pass through the guide branch point along the guide route, a guide image encouraging to move to the recommended lane, etc.

The speaker 16 outputs voice guidance that guides the vehicle to travel along the guide route based on instructions from the navigation ECU 13 and guidance on traffic information.

The DVD drive 17 is a drive that can read data recorded on a recording medium such as DVD and CD. For example, music or video is played or the map information DB 31 is updated based on the read data. The navigation device 1 may include a card slot for reading and writing a memory card, instead of the DVD drive 17.

The communication module 18 is a communication device that receives traffic information transmitted from a traffic information center such as VICS center or probe center. The traffic information includes various kinds of information such as traffic congestion information, traffic regulation information, and traffic accident information. The communication module 18 is, for example, a mobile phone or a Data Communication Module (DCM).

The front camera 19 is an imaging device with a camera using a solid-state imaging device such as charge-coupled device (CCD). For example, the front camera 19 is mounted on the back of a rearview mirror or on a front bumper with its optical axis extending forward in the direction of travel of the vehicle. As described above, an image captured by the front camera 19 is displayed on the liquid crystal display 15 as a landscape (image of an actual view) around the vehicle (particularly in front of the vehicle). As will be described later, the image captured by the front camera 19 is also used when identifying the lane in which the vehicle is currently traveling.

Figure 2:
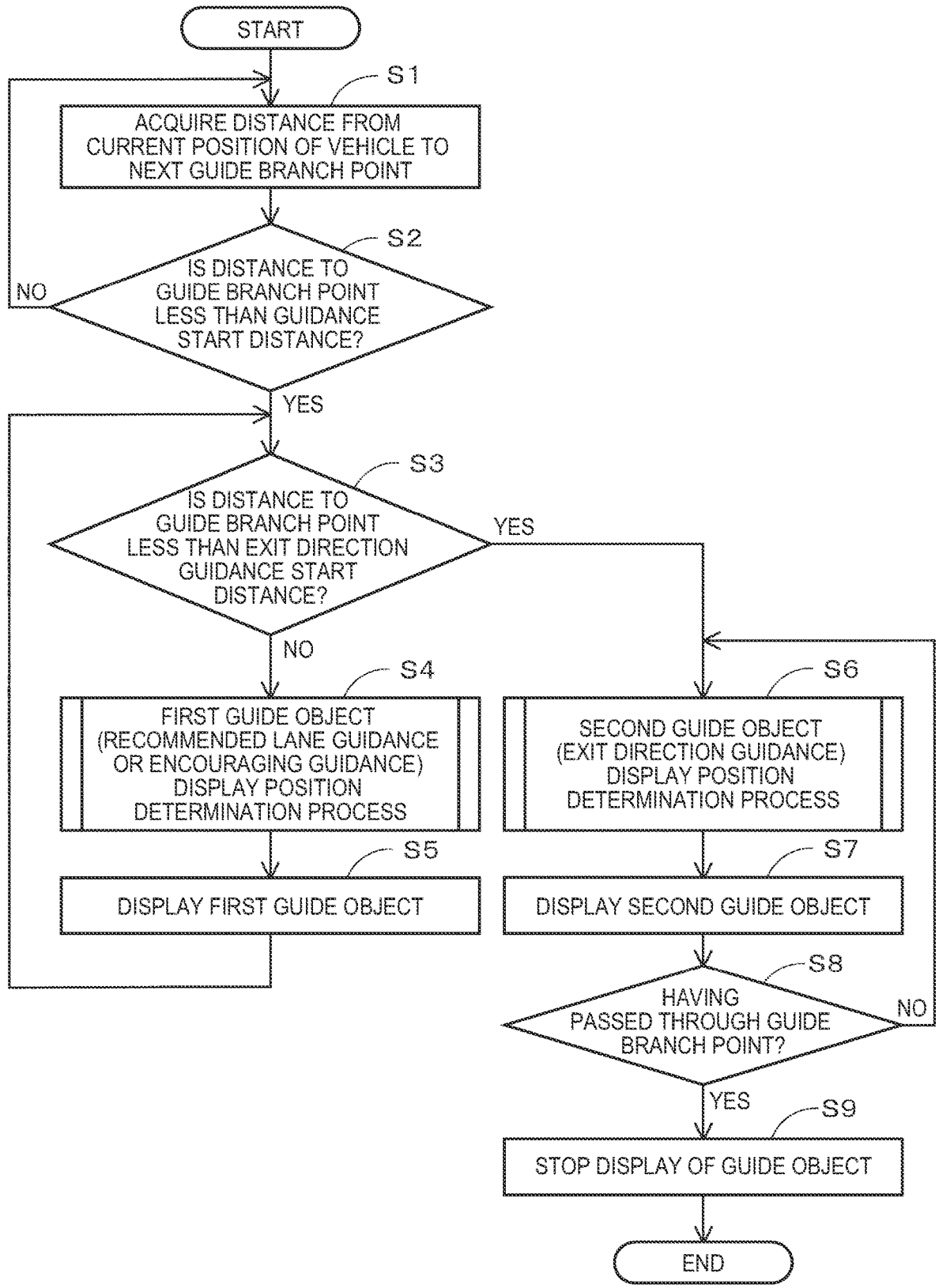
FIG. 2 is a flow chart of a driving assistance processing program according to the first embodiment.

Next, the driving assistance processing program that is executed by the navigation ECU 13 in the navigation device 1 having the above configuration will be described with reference to FIG. 2. FIG. 2 is a flowchart of the driving assistance processing program according to the first embodiment. The driving assistance processing program is a program that is executed after an accessory (ACC) power supply of the vehicle is turned on, and that assists in driving the vehicle by making visible the guide object displayed superimposed on the landscape around the vehicle on the liquid crystal display 15. Programs shown in the flowcharts of FIGS. 2, 5, and 16 that will be described below are stored in the RAM 42 and ROM 43 of the navigation device 1 and are executed by the CPU 41.

An example in which travel guidance on a guide route set in the navigation device 1 is provided as driving assistance for the vehicle using the guide object will be described below. The guide object to be displayed is guide information that provides guidance on a guide branch point located ahead in the direction of travel of the vehicle. A process that is performed when an arrow indicating the exit direction at the guide branch point, a guide image indicating the position and direction of a recommended lane, and a guide image encouraging to move to the recommended lane are displayed as the guide object will be described as an example. However, the navigation device 1 can also provide guidance and information other than the driving assistance by using the guide object. The guide object to be displayed can be information other than the arrow and the guide image. For example, the following can be displayed as the guide object: warnings against objects against which the vehicle occupant is to be warned or alerted (other vehicles, pedestrians, and guide signs); warnings to be displayed on the road surface (frequent collision areas, speed limits, etc.); distance to the next guide branch point; current vehicle speed; shift position; remaining energy; advertising images; facility information; guide signs; map image; traffic information; news; weather forecast; time; and screen of a connected smartphone.

In the driving assistance processing program, in step (hereinafter abbreviated as "S") 1 ("S1"), the CPU 41 first identifies the current position of the vehicle based on the detection result of the current position detection unit 11 and map information. When identifying the current position of the vehicle, the CPU 41 also performs a map matching process in which the current position of the vehicle is matched with the map information. The CPU 41 then reads the guide route set in the navigation device 1, and calculates the distance from the identified current position of the vehicle to the next guide branch point on the guide route. The guide branch point is a branch point (intersection) on which the navigation device 1 provides guidance, such as instructing to turn right or left, when the navigation device 1 provides travel guidance according to the guide route set in the navigation device 1. A branch point (difficult intersection) that does not require a right turn or left turn but has an unusual shape is also the guide branch point.

Next, in S2, the CPU 41 determines whether the distance to the next guide branch point calculated in S1 is less than a predetermined guidance start distance. The guidance start distance is determined by the type of the road on which the vehicle travels. For example, the guidance start distance for expressways is 1 km, and the guidance start distance for local roads is 300 m that is shorter than the guidance start distance for expressways. However, the guidance start distance may be a variable value instead of a fixed value. For example, when there is another branch point within 300 m before the guide branch point on a local road, the guidance start distance may be the distance from the guide branch point to the another branch point.

When the CPU 41 determines that the distance to the next guide branch point calculated in S1 is less than the guidance start distance (S2: YES), the routine proceeds to S3. When the CPU 41 determines that the distance to the next guide branch point calculated in S1 is not less than the guidance start distance (S2: NO), the routine returns to S1.

In S3, the CPU 41 determines whether the distance to the next guide branch point is less than a predetermined exit direction guidance start distance. The exit direction guidance start distance is a distance shorter than the guidance start distance that is a criterion for determination in S2, and is determined by the type of the road on which the vehicle travels. For example, the exit direction guidance start distance for expressways is 300 m, and the exit direction guidance start distance for local roads is 50 m that is shorter than the exit direction guidance start distance for expressways.

When the CPU 41 determines that the distance to the next guide branch point is less than the exit direction guidance start distance (S3: YES), the routine proceeds to S6. When the CPU 41 determines that the distance to the next guide branch point is not less than the exit direction guidance start distance (S3: NO), the routine proceeds to S4.

Thereafter, in S4, the CPU 41 performs a first guide object display position determination process (FIG. 5) that will be described later. The first guide object display position determination process is a process in which a guide image indicating the position and direction of the recommended lane or a guide image encouraging to move to the recommended lane is used as a guide object (hereinafter referred to as the "first guide object") to be displayed, and the display size and shape of the first guide object on the liquid crystal display 15 and the display position (range) of the first guide object on the liquid crystal display 15 are specifically determined. The display size and shape of the first guide object and the display position of the first guide object determined in S4 are, for example, the conditions for superimposing the guide object on the recommended lane in the landscape, the vehicle's lane of travel, or the lane between the recommended lane and the vehicle's lane of travel so that the vehicle occupant can see the guide object.

Subsequently, in S5, the CPU 41 generates an image of the first guide object with the display size and shape determined in S4, transmits a control signal to the liquid crystal display 15, and draws the generated image of the first guide object at the display position (in the display range) determined in S4 on the liquid crystal display 15. An image captured by the front camera 19 in advance before the distance from the vehicle to the guide branch point became less than the guidance start distance, that is, the current landscape (image of the current actual view) around the vehicle (particularly in front of the vehicle), has been displayed on the liquid crystal display 15. The vehicle occupant can thus see the first guide object superimposed on the landscape.

Figure 3:
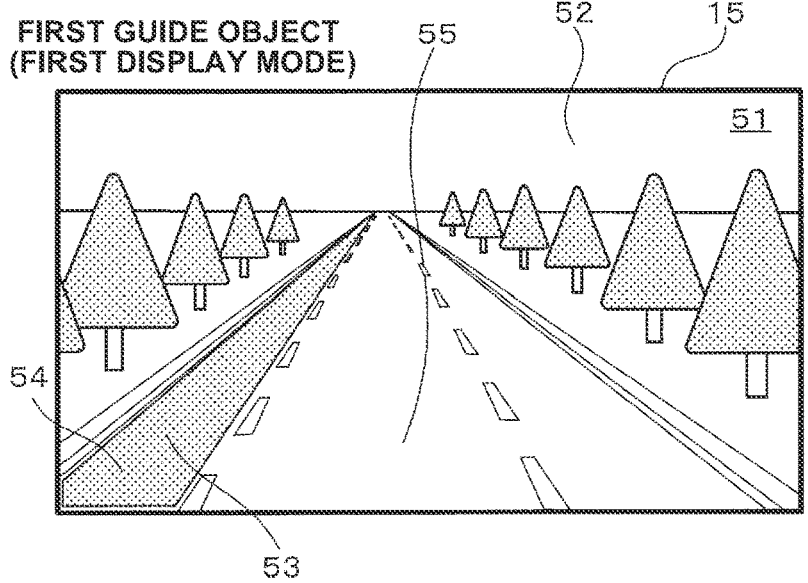
FIG. 3 shows examples of a first guide object displayed on a liquid crystal display.
Figure 3:
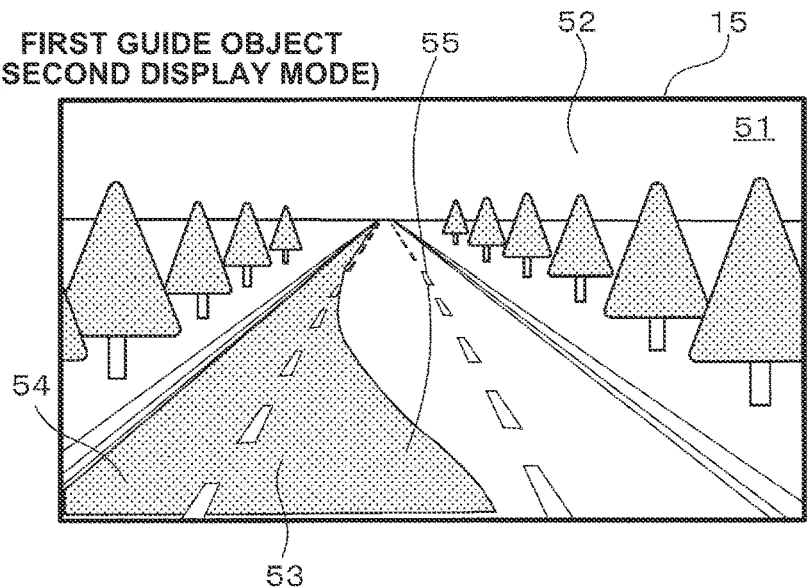
Figure 3:
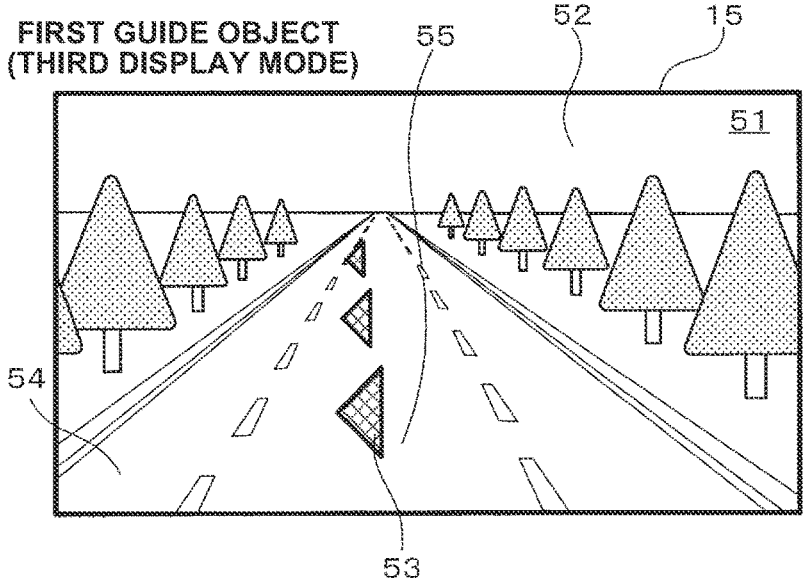

FIG. 3 shows examples of a travel guidance screen 51 displayed on the liquid crystal display 15 in S5. As shown in FIG. 3, a current landscape 52 in front of the vehicle captured by the front camera 19 is displayed on the liquid crystal display 15. An image 53 of the first guide object is displayed superimposed on the landscape 52 in front of the vehicle.

In the first embodiment, a plurality of types of guide objects is present as guide objects to be used for guidance, and one or more types of guide objects selected according to the content of guidance and the current situation are displayed. There are cases where two or more types of guide objects are selected to be displayed at the same time. The examples shown in FIG. 3 are examples of the travel guidance screen 51 displayed when the distance from the current position of the vehicle to the guide branch point becomes less than the guidance start distance and equal to or greater than the exit direction guidance start distance (e.g., 1 km to 300 m to the guide branch point). These examples show a first display mode, a second display mode, and a third display mode. In the first display mode, a guide image providing guidance by distinguishing a recommended lane 54 in which the vehicle is recommended to travel on the road on which the vehicle is currently traveling in order for the vehicle to pass through the guide branch point along the guide route is displayed as the image 53 of the first guide object. In the second display mode, a guide image that provides guidance by distinguishing the recommended lane 54 from the other lanes and that encourages to move to the recommended lane 54 is displayed as the image 53 of the first guide object. In the third display mode, a guide image that provides guidance on the direction toward the recommended lane 54 (that is also the exit direction at the guide branch point) is displayed as the image 53 of the first guide object.

As shown in FIG. 3, the image 53 of the first guide object is basically displayed superimposed on the recommended lane 54 in the landscape 52, or on the region from a lane 55 in which the vehicle is currently traveling (hereinafter also referred to as the "vehicle's lane of travel") to the recommended lane 54. Whether the first guide object is displayed in the first display mode, the second display mode, or the third display mode is determined based on the confidence of the identification result of the lane in which the vehicle is currently traveling, as described below. Specifically, when the confidence of the identification result of the lane in which the vehicle is currently traveling is high (when the identification result of the lane is confident), the first guide object is displayed in the first or second display mode having high guiding capability to guide the vehicle to the recommended lane. On the other hand, when the confidence of the identification result of the lane in which the vehicle is currently traveling is low (when the identification result of the lane is not confident), the first guide object is displayed in the third display mode having low guiding capability to guide the vehicle to the recommended lane. When the confidence is high, whether the guide object is displayed in the first display mode or the second display mode may be switched based on the distance from the vehicle to the guidance branch point or may be switched based on the positional relationship between the vehicle's lane of travel and the recommended lane, or the guide object may be displayed in only a predetermined one of the display modes.

The distance to the guide branch point may be displayed on the image 53 of the first guide object. Thereafter, the routine returns to S3, and the image 53 of the first guide object continues to be displayed until the distance to the next guide branch point becomes less than the exit direction guidance start distance. The first guide object will be described in more detail later.

In S6, the CPU 41 performs a second guide object display position determination process (FIG. 16) that will be described later. The second guide object display position determination process is a process in which an arrow indicating the exit direction at the guide branch point is used as a guide object (hereinafter referred to as the "second guide object") to be displayed, and the display size and shape of the second guide object on the liquid crystal display 15 and the display position (range) of the second guide object on the liquid crystal display 15 are specifically determined. The display size and shape of the second guide object and the display position of the second guide object determined in S6 are, for example, the conditions for superimposing the guide object above the road at a predetermined distance from the vehicle or above the road at the guide branch point in the landscape so that the vehicle occupant can see the guide object.

Subsequently, in S7, the CPU 41 generates an image of the second guide object with the display size and shape determined in S6, transmits a control signal to the liquid crystal display 15, and draws the generated image of the second guide object at the display position (in the display range) determined in S6 on the liquid crystal display 15. An image captured by the front camera 19 in advance before the distance from the vehicle to the guide branch point became less than the guidance start distance, that is, the current landscape (image of the current actual view) around the vehicle (particularly in front of the vehicle), has been displayed on the liquid crystal display 15. The vehicle occupant can thus see the second guide object superimposed on the landscape.

Figure 4:
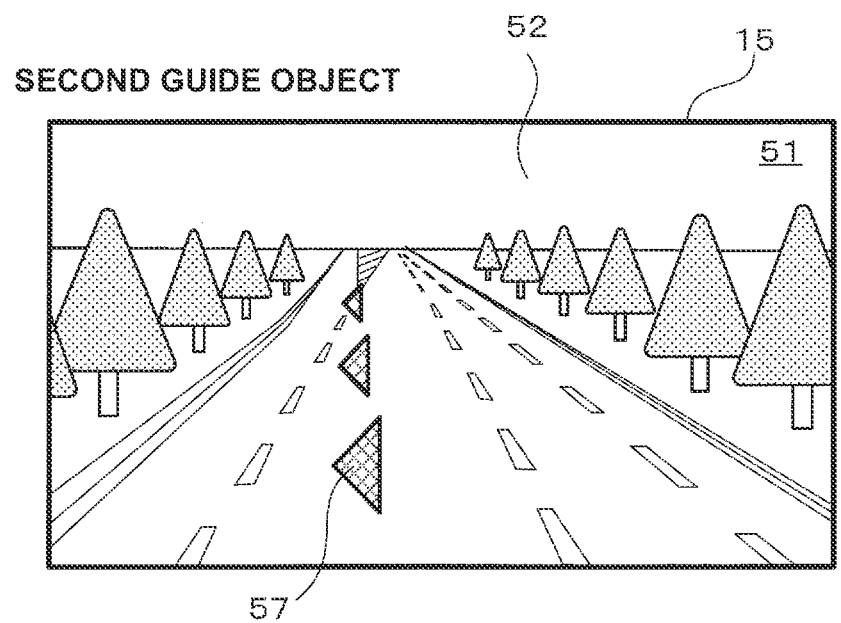
FIG. 4 shows an example of a second guide object displayed on the liquid crystal display.

FIG. 4 shows an example of the travel guidance screen 51 displayed on the liquid crystal display 15 in S7. As shown in FIG. 4, the current landscape 52 in front of the vehicle captured by the front camera 19 is displayed on the liquid crystal display 15. An image 57 of the second guide object is displayed superimposed on the landscape 52 in front of the vehicle.

In the first embodiment, a plurality of types of guide objects is present as guide objects to be used for guidance, and one or more types of guide objects selected according to the content of guidance and the current situation are displayed. There are cases where two or more types of guide objects are selected to be displayed at the same time. The example shown in FIG. 4 is an example of the travel guidance screen 51 displayed when the distance from the current position of the vehicle to the guide branch point becomes less than the exit direction guidance start distance (e.g., 300 m to the guide branch point). In this example, a plurality of arrows indicating the exit direction at the guide branch point is displayed as the image 57 of the second guide object at the position above the road on which the vehicle is currently traveling along the future course of the vehicle.

The image 57 of the second guide object includes images of a plurality of arrow-shaped objects. The images of the arrow-shaped objects are displayed above the road on which the vehicle is currently traveling in such a way that the images of the arrow-shaped objects are located at predetermined intervals along the future course of the vehicle. The direction of each arrow indicates the exit direction of the vehicle at the guide object point. As will be described later, when the vehicle is away from the guide branch point, the image 57 of the second guide object is displayed in a mode in which the image 57 is located at a fixed relative position with respect to the vehicle (hereinafter referred to as the "first mode"). When the vehicle approaches the guide branch point to a certain extent, the image 57 of the second guide object is displayed in a mode in which the image 57 is located at a fixed relative position with respect to the guide branch point located in the landscape 52 (hereinafter referred to as the "second mode"). Particularly in the second mode, a part of the image 57 of the second guide object is fixedly displayed superimposed on the guide branch point. Accordingly, when the vehicle occupant sees the travel guidance screen 51, he or she can be accurately aware of the course of the vehicle, the position of the guide branch point where the vehicle is supposed to turn right or left, and the exit direction at the guide branch point. The image 57 of the second guide object continues to be displayed until the vehicle passes through the guide branch point. The second guide object will be described in more detail later.

Thereafter, in S8, the CPU 41 determines whether the vehicle has passed through the guide branch point. For example, the CPU 41 determines whether the vehicle has passed through the guide branch point, based on the current position of the vehicle detected by the current position detection unit 11 and the map information.

When the CPU 41 determines that the vehicle has passed through the guide branch point (S8: YES), the CPU 41 transmits a control signal to the liquid crystal display 15 to stop display of the guide object being displayed on the liquid crystal display 15 (S9). When stopping display of the guide object, it is desirable to increase the transmittance of the displayed image of the guide object stepwise according to the distance to the guide branch point so that the transmittance eventually becomes equal to 100% when the vehicle reaches the guide branch point. The image captured by the front camera 19, that is, the current landscape (image of the actual view) around the vehicle (particularly in front of the vehicle), continues to be displayed for a certain period of time even after display of the guide object is stopped. The display of the captured image is then switched to the display of the map image.

When the CPU 41 determines that the vehicle has not passed through the guide branch point (S8: NO), the routine returns to S6, and the guide object continues to be displayed.

Figure 5:
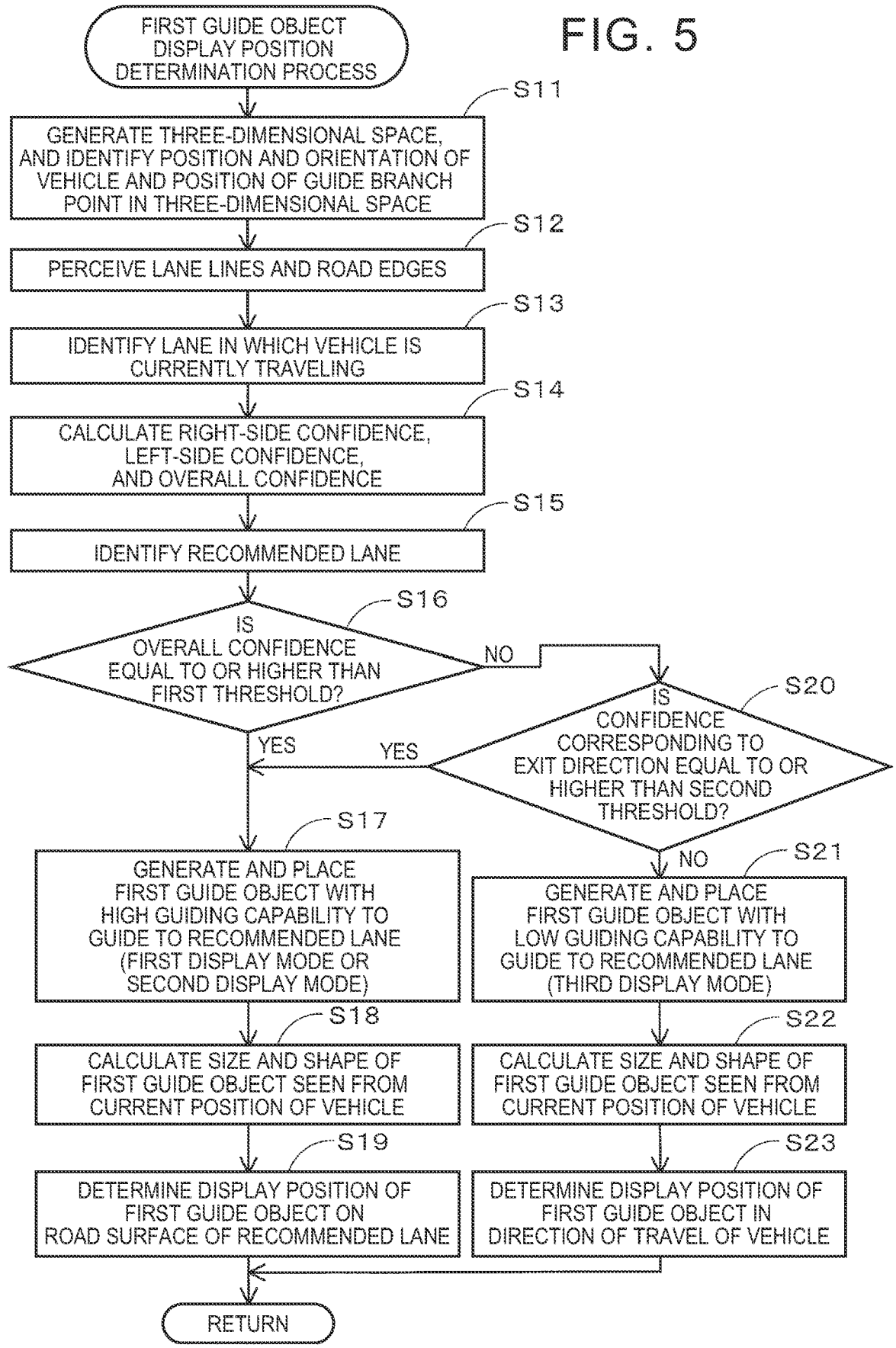
FIG. 5 is a flowchart of a sub-process program of a first guide object display position determination process.

Next, a sub-process of the first guide object display position determination process that is performed in S4 will be described with reference to FIG. 5. FIG. 5 is a flowchart of a sub-process program of the first guide object display position determination process.

First, in S11, the CPU 41 generates a three-dimensional space corresponding to the area around the current position of the vehicle (particularly in front of the vehicle in the direction of travel of the vehicle). Not only roads but also building, road signs, etc. may be modeled in the three-dimensional space, or only roads may be modeled in the three-dimensional space. Alternatively, the three-dimensional space may be a mere empty three-dimensional space in which roads are not modeled and there is only the ground. Alternatively, the three-dimensional space may be stored in advance in the map information DB 31 as three-dimensional map information, and the three-dimensional map information on the relevant area around the vehicle position may be read from the map information DB 31 in S11. The CPU 41 may generate a three-dimensional space based on the image captured by the front camera 19. For example, the CPU 41 can generate a three-dimensional space by performing point cloud matching on the image captured by the front camera 19 and thus detecting a road and structures located around the road.

In S11, the CPU 41 also identifies the current position and orientation of the vehicle in the generated three-dimensional space based on the parameters detected by the current position detection unit 11. In particular, the position of the front camera 19 mounted on the vehicle is identified as the current position of the vehicle, and the optical axis direction of the front camera 19 is identified as the orientation of the vehicle. The position of the front camera 19 is the position of the vehicle occupant, and the optical axis direction of the front camera 19 is the gaze direction of the vehicle occupant. In S11, the CPU 41 also identifies the position of the guide branch point located in front of the vehicle in the direction of travel of the vehicle in the generated three-dimensional space.

Next, in S12, the CPU 41 perceives (detects) features located around the vehicle by performing image processing on the image captured by the front camera 19. Specifically, in the present embodiment, lane lines drawn on the road surface (including not only the road surface of the lane in which the vehicle travels but also the road surface of the lane(s) other than the lane in which the vehicle travels) and road edges (specifically, the edges of a roadway, and when there is a sidewalk, the boundary between the roadway and the sidewalk) are to be perceived (detected). As for the lane lines, it is desirable to detect the colors and types (solid line, dashed line, etc.) of the lane lines as well. As for the road edges, structures installed along the road edges, such as blocks, guardrails, and medians, are basically detected as the road edges. For roads with no such structures along the road edges, the edges of asphalt paving or the outermost lane lines may be detected as the road edges.

The lane line detection process in S12 will be briefly described below. First, the CPU 41 performs brightness correction on the road surface and the lane lines based on the brightness difference in order to detect the lane lines in the image captured by the front camera 19. Next, the CPU 41 performs processes such as a binarization process for separating the lane lines from the image, a geometric process for correcting distortion, and a smoothing process for removing noise from the image, and thus detects the boundary lines between the road surface and the lane lines. The presence and types of the lane lines are identified by the detected boundary lines. The color of each lane line can also be detected by extracting an image portion of the range where the lane lines have been detected, and performing color recognition (red, green, and blue (RGB) value detection) on the extracted image portion.

Next, the road edge detection process in S12 will be briefly described. First, in order to detect the road edges in the image captured by the front camera 19, the CPU 41 performs brightness correction on the road surface and the structures installed along the road edges (such as blocks, guardrails, and medians) based on the brightness difference. Next, the CPU 41 performs processes such as a binarization process for separating the structures from the image, a geometric process for correcting distortion, and a smoothing process for removing noise from the image, and thus detects the boundary lines between the road surface and the structures. The presence of the road edges is identified by the detected boundary lines. A pattern matching process using feature points and templates may be performed to detect the lane lines and the road edges. Since these image recognition processes are already known in the art, detailed description thereof will be omitted. Other vehicles etc. located on the road may also be detected in addition to the lane lines and the road edges.

Then, in S13, the CPU 41 identifies the "vehicle's lane of travel" that is the lane in which the vehicle is currently driving, based on the detection results of the feature perception process performed in S12. Specifically, the CPU 41 identifies the vehicle's lane of travel by the following process. In S13, the position of the "vehicle's lane of travel" in the three-dimensional space generated in S11 is also identified.

Examples of the method for identifying the vehicle's lane of travel include a method using the types and number of lane lines and a method using the distances from the road edges and the lane widths.

[Identification of Vehicle's Lane of Travel (Pattern 1)]

Figure 6:
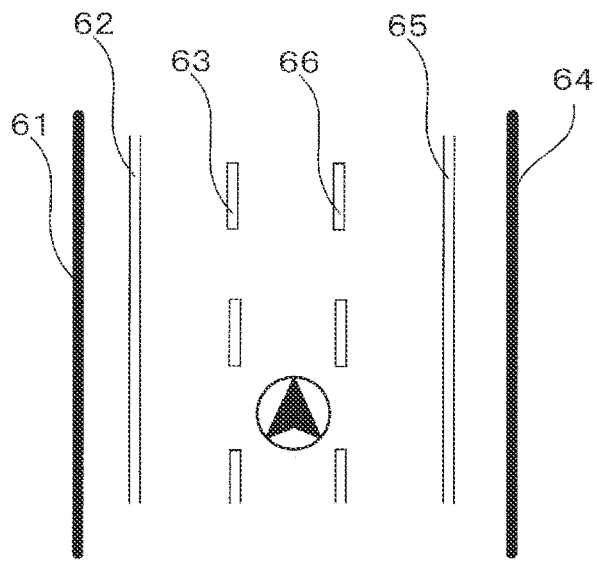
FIG. 6 illustrates a method for detecting a vehicle's lane of travel.
Figure 7:
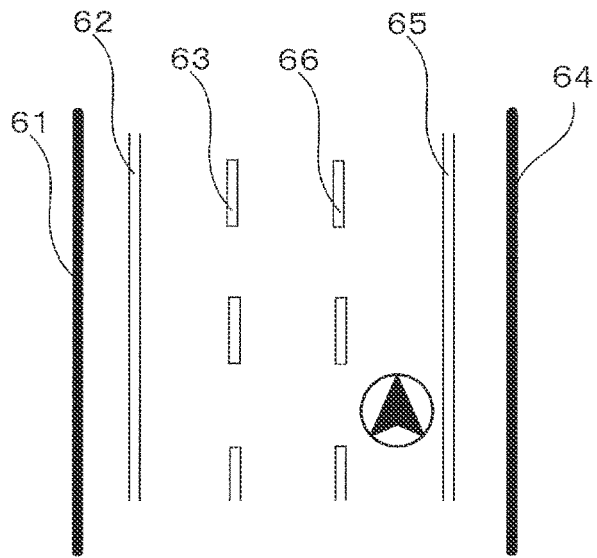
FIG. 7 illustrates a method for detecting a vehicle's lane of travel.
Figure 8:
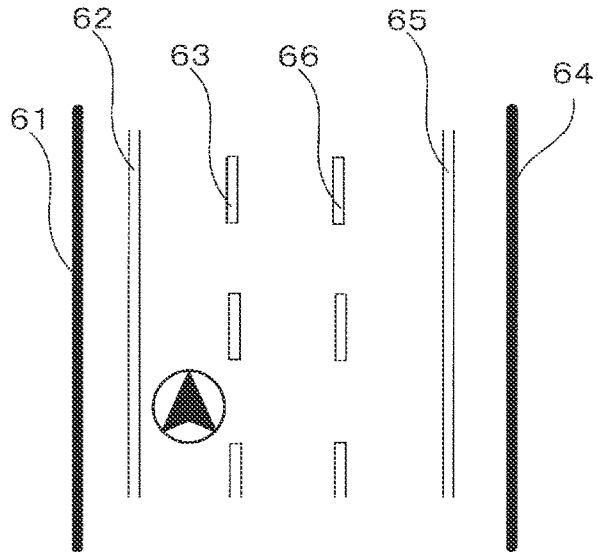
FIG. 8 illustrates a method for detecting a vehicle's lane of travel.

The method using the types and number of lane lines will be described. For example, it is herein assumed that the vehicle travels on an expressway with three lanes in each direction as shown in FIGS. 6 to 8. In this example, the CPU 41 first acquires the perception results of the road edge and lane lines located on the left side of the vehicle. As for the perception results of the lane lines, the CPU 41 also acquires the colors and types of the lane lines. For example, when a road edge 61 is detected, an edge line 62 that is a solid white line located next to the road edge 61 is detected, and one lane boundary line 63 that is a dashed or solid white line is detected between the edge line 62 and the vehicle, it can be identified that the vehicle is traveling in the second lane from the left as shown in FIG. 6. Similarly, when two lane boundary lines 63, 66 are detected between the edge line 62 and the vehicle, it can be identified that the vehicle is traveling in the third lane from the left as shown in FIG. 7. When no lane boundary line 63, 66 is detected between the edge line 62 and the vehicle, it can be identified that the vehicle is traveling in the leftmost lane as shown in FIG. 8.

The CPU 41 also acquires the perception results of the road edge and lane lines located on the right side of the vehicle in a manner similar to that described above. As for the perception results of the lane lines, the CPU 41 also acquires the colors and types of the lane lines. For example, when a road edge 64 is detected, an edge line 65 that is a solid white line located next to the road edge 64 is detected, and one lane boundary line 66 that is a dashed or solid white line is detected between the edge line 65 and the vehicle, it can be identified that the vehicle is traveling in the second lane from the right as shown in FIG. 6. Similarly, when two lane boundary lines 63, 66 are detected between the edge line 65 and the vehicle, it can be identified that the vehicle is traveling in the third lane from the right as shown in FIG. 8. When no lane boundary line 63, 66 is detected between the edge line 65 and the vehicle, it can be identified that the vehicle is traveling in the rightmost lane as shown in FIG. 7.

The CPU 41 identifies the vehicle's lane of travel by ultimately combining the following two positions of the vehicle's lane of travel identified as described above: the position of the vehicle's lane of travel identified with respect to the left edge of the road (number of lanes from the left edge of the road to the lane in which the vehicle is currently traveling), and the position of the vehicle's lane of travel identified with respect to the right edge of the road (number of lanes from the right edge of the road to the lane in which the vehicle is currently traveling). For example, in the example shown in FIG. 6, the vehicle's lane of travel is identified as the second lane from the left and the second lane from the right. In the example shown in FIG. 7, the vehicle's lane of travel is identified as the third lane from the left and the first lane from the right. In the example shown in FIG. 8, the vehicle's lane of travel is identified as the first lane from the left and the third lane from the right.

It is desirable to identify the vehicle's lane of travel by considering the map information in addition to the perception results of the road edges and lane lines. The link data 32 included in the map information stores, for each road, the number of lanes and whether there is any oncoming lane (whether the road is a two-way traffic section). With the image recognition by the front camera 19, when a solid or dashed white line is detected near the center of a local road, it is difficult to determine whether this section line is a center line or a lane boundary line. However, this determination can be easily made by using the map information. As a result, even in a section in which there is an oncoming lane(s), the vehicle's lane of travel can be accurately identified by considering the presence of the oncoming lane(s). For example, when the vehicle is traveling on a road with two lanes in each direction without a median, namely a road with a total of four lanes without a median, and it is identified that the vehicle is traveling in the third lane from the right, it can be determined from the map information that the first and second lanes from the right are oncoming lanes. Therefore, it can be identified that the vehicle is traveling on the right lane of the road with two lanes in each direction.

[Identification of Vehicle's Lane of Travel (Pattern 2)]

Next, the method using the distances from the road edges and the lane widths will be described. For example, as in the case of the method using the types and number of lane lines, it is herein assumed that the vehicle travels on an expressway with three lanes in each direction as shown in FIGS. 6 to 8. In this example, the CPU 41 first detects the lane lines on both sides of the vehicle (in the example shown in FIG. 6, the lane boundary lines 63, 66; in the example shown in FIG. 7, the lane boundary line 66 and the edge line 65; and in the example shown in FIG. 8, the edge line 62 and the lane boundary line 63), and identifies the width of the lane in which the vehicle is traveling based on the distance between the detected lane lines. The CPU 41 then calculates the distance from the road edge 61 or edge line 62 located on the left side of the vehicle to the vehicle in the lateral direction of the road, and calculates how many lanes the calculated distance is equivalent to. When the calculated distance from the road edge 61 or edge line 62 to the vehicle is equivalent to one lane, it can be identified that the vehicle is traveling in the second lane from the left as shown in FIG. 6. Similarly, when the calculated distance from the road edge 61 or edge line 62 to the vehicle is equivalent to two lanes, it can be identified that the vehicle is traveling in the third lane from the left as shown in FIG. 7. When the calculated distance from the road edge 61 or edge line 62 to the vehicle is less than one lane, it can be identified that the vehicle is traveling in the leftmost lane as shown in FIG. 8.

The CPU 41 also similarly calculates the distance from the road edge 64 or edge line 65 located on the right side of the vehicle to the vehicle. When the calculated distance from the road edge 64 or edge line 65 to the vehicle is equivalent to one lane, it can be identified that the vehicle is traveling in the second lane from the right as shown in FIG. 6. Similarly, when the calculated distance from the road edge 64 or edge line 65 to the vehicle is equivalent to two lanes, it can be identified that the vehicle is traveling in the third lane from the right as shown in FIG. 8. When the calculated distance from the road edge 64 or edge line 65 to the vehicle is less than one lane, it can be identified that the vehicle is traveling in the right lane as shown in FIG. 7.

The CPU 41 identifies the vehicle's lane of travel by ultimately combining the following two positions of the vehicle's lane of travel identified as described above: the position of the vehicle's lane of travel identified with respect to the left edge of the road (number of lanes from the left edge of the road to the lane in which the vehicle is currently traveling), and the position of the vehicle's lane of travel identified with respect to the right edge of the road (number of lanes from the right edge of the road to the lane in which the vehicle is currently traveling). For example, in the example shown in FIG. 6, the vehicle's lane of travel is identified as the second lane from the left and the second lane from the right. In the example shown in FIG. 7, the vehicle's lane of travel is identified as the third lane from the left and the first lane from the right. In the example shown in FIG. 8, the vehicle's lane of travel is identified as the first lane from the left and the third lane from the right.

It is desirable to identify the vehicle's lane of travel by considering the map information in addition to the perception results of the road edges and lane widths. The link data 32 included in the map information stores, for each road, the number of lanes and whether there is any oncoming lane (whether the road is a two-way traffic section). As a result, even in a section in which there is an oncoming lane(s), the vehicle's lane of travel can be accurately identified by considering the presence of the oncoming lane(s). For example, when the vehicle is traveling on a road with two lanes in each direction without a median, namely a road with a total of four lanes without a median, and it is identified that the vehicle is traveling in the third lane from the right, it can be determined from the map information that the first and second lanes from the right are oncoming lanes. Therefore, it can be identified that the vehicle is traveling on the right lane of the road with two lanes in each direction.

In addition to the lane lines and road edges, the detection results of other vehicles traveling on the road may be used to identify the vehicle's lane of travel. For example, even when lane lines cannot be clearly detected, a lane(s) can be estimated to be present based on the positions of other vehicles.

Subsequently, in S14, the CPU 41 calculates the confidence indicating how confident the identification result of the vehicle's lane of travel obtained in S13 is. In particular, in the present embodiment, the CPU 41 calculates the following three confidences: (a) right-side confidence, (b) left-side confidence, and (c) overall confidence. The right-side confidence is the confidence when the position of the vehicle's lane of travel is identified with respect to the right edge of the road based on the detection results of the lane lines and road edge located on the right side of the vehicle in the direction of travel of the vehicle. The left-side confidence is the confidence when the position of the vehicle's lane of travel is identified with respect to the left edge of the road based on the detection results of the lane lines and road edge located on the left side of the vehicle in the direction of travel of the vehicle. The overall confidence is the overall confidence (total confidence) of the right-side confidence and the left-side confidence.

A method for calculating the right-side confidence, the left-side confidence, and the overall confidence will be described below using examples.

[Right-Side Confidence]

First, the confidence for each lane line estimated to be present on the right side of the vehicle's lane of travel identified in S13 (hereinafter referred to as the "lane line confidence C") is calculated by the following expression (1). For example, when the vehicle's lane of travel is identified as the middle lane of an expressway with three lanes in each direction as shown in FIG. 6, the lane boundary line 66 and the edge line 65 are supposed to be present on the right side of the vehicle's lane of travel. The lane line confidence C is calculated for each of these two lane lines. When the vehicle's lane of travel is identified as the rightmost lane of an expressway with three lanes in each direction as shown in FIG. 7, the edge line 65 is supposed to be present on the right side of the vehicle's lane of travel. The lane line confidence C is calculated for this single lane line. When the vehicle's lane of travel is identified as the leftmost lane of an expressway with three lanes in each direction as shown in FIG. 8, the lane boundary lines 63, 66 and the edge line 65 are supposed to be present on the right side of the vehicle's lane of travel. The lane line confidence C is calculated for each of these three lane lines.

$$C=(10 \times V1+V2+V3+V4)/13 \qquad (1)$$

V1 represents whether the lane line for which the lane line confidence C is to be calculated was able to be detected in the image recognition process in S12 (whether the presence of the lane line was able to be perceived). V1 is set to "1" when the lane line was able to be detected, and is set to "0" when the lane line was not able to be detected.

V2 represents whether the color of the lane line for which the lane line confidence C is to be calculated was able to be detected in the image recognition process in S12. V2 is set to "1" when the color of the lane line was able to be detected, and is set to "0" when the color of the lane line was not able to be detected. Even when the color of the lane line was able to be detected, V2 may be set to "0" when the detected color does not match the color estimated using map information etc.

V3 represents whether the type (e.g., solid line or dashed line) of the lane line for which the lane line confidence C is to be calculated was able to be detected in the image recognition process in S12. V3 is set to "1" when the type of the lane line was able to be detected, and is set to "0" when the type of the lane line was not able to be detected. Even when the type of the lane line was able to be detected, V3 may be set to "0" when the detected type does not match the type estimated using map information etc.

V4 represents whether the tilt of the lane line for which the lane line confidence C is to be calculated particularly with respect to the direction of travel of the road as detected in the image recognition process in S12 is less than a threshold (e.g., 10 degrees). V4 is set to "1" when the detected tilt is less than the threshold, and is set to "0" when the detected tilt is equal to or greater than the threshold.

Thereafter, the right-side confidence CR is calculated by adding all of the lane line confidences C calculated for each of the lane lines estimated to be present on the right side of the vehicle's lane of travel. The right-side confidence CR is calculated based more on the lane line confidence C of the lane line far away from the vehicle than on the lane line confidence C of the lane line near the vehicle. For example, when the vehicle's lane of travel is identified as the middle lane of an expressway with three lanes in each direction as shown in FIG. 6, the right-side confidence CR is calculated by the following expression (2), where $C_1$ represents the lane line confidence C calculated for the lane boundary line 66 that is closest to the vehicle's lane of travel, and $C_2$ represents the lane line confidence C calculated for the edge line 65 that is second closest to the vehicle's lane of travel.

$$CR=(C_1+2 \times C_2)/3 \qquad (2)$$

When the vehicle's lane of travel is identified as the rightmost lane of an expressway with three lanes in each direction as shown in FIG. 7, the right-side confidence CR is calculated by the following expression (3), where $C_1$ represents the lane line confidence C calculated for the edge line 65 that is the only lane line located on the right side of the vehicle's lane of travel.

$$CR=C_1 \qquad (3)$$

When the vehicle's lane of travel is identified as the leftmost lane of an expressway with three lanes in each direction as shown in FIG. 8, the right-side confidence CR is calculated by the following expression (4), where $C_1$ represents the lane line confidence C calculated for the lane boundary line 63 that is closest to the vehicle's lane of travel, $C_2$ represents the lane line confidence C calculated for the lane boundary line 66 that is second closest to the vehicle's lane of travel, and $C_3$ represents the lane line confidence C calculated for the edge line 65 that is third closest to the vehicle's lane of travel.

$$CR=(C_1+2 \times C_2+4 \times C_3)/7 \qquad (4)$$

The coefficients by which each lane line confidence C is multiplied in the above expressions (2) to (4) can be changed as appropriate. It is desirable to set the coefficients so that the lane line confidence C calculated for the lane line farther away from the vehicle's lane of travel is multiplied by a greater coefficient.

The right-side confidences CR thus calculated by the above expressions (2) to (4) have a value of 0 or more and 1 or less. The closer to 1 the calculated right-side confidence CR is, the higher the confidence of the position of the vehicle's lane of travel identified with respect to the right edge of the road is.

[Left-Side Confidence]

Next, the lane line confidence C for each lane line estimated to be present on the left side of the vehicle's lane of travel identified in S13 is calculated by the above expression (1). For example, when the vehicle's lane of travel is identified as the middle lane of an expressway with three lanes in each direction as shown in FIG. 6, the edge line 62 and the lane boundary line 63 are supposed to be present on the left side of the vehicle's lane of travel. The lane line confidence C is calculated for each of these two lane lines. When the vehicle's lane of travel is identified as the rightmost lane of an expressway with three lanes in each direction as shown in FIG. 7, the edge line 62 and the lane boundary lines 63, 66 are supposed to be present on the left side of the vehicle's lane of travel. The lane line confidence C is calculated for each of these three lane lines. When the vehicle's lane of travel is identified as the leftmost lane of an expressway with three lanes in each direction as shown in FIG. 8, the edge line 62 is supposed to be present on the left side of the vehicle's lane of travel. The lane line confidence C is calculated for this single lane line. Since the method for calculating the lane line confidence C is similar to that described above for the right-side confidence, description thereof will be omitted.

Thereafter, the left-side confidence CL is calculated by adding all of the lane line confidences C calculated for each of the lane lines estimated to be present on the left side of the vehicle's lane of travel. The left-side confidence CL is calculated based more on the lane line confidence C of the lane line far away from the vehicle than on the lane line confidence C of the lane line near the vehicle. For example, when the vehicle's lane of travel is identified as the middle lane of an expressway with three lanes in each direction as shown in FIG. 6, the left-side confidence CL is calculated by the following expression (5), where $C_1$ represents the lane line confidence C calculated for the lane boundary line 63 that is closest to the vehicle's lane of travel, and $C_2$ represents the lane line confidence C calculated for the edge line 62 that is second closest to the vehicle's lane of travel.

$$CL=(C_1+2\times C_2)/3 \quad (5)$$

When the vehicle's lane of travel is identified as the rightmost lane of an expressway with three lanes in each direction as shown in FIG. 7, the left-side confidence CL is calculated by the following expression (6), where $C_1$ represents the lane line confidence C calculated for the lane boundary line 66 that is closest to the vehicle's lane of travel, $C_2$ represents the lane line confidence C calculated for the lane boundary line 63 that is second closest to the vehicle's lane of travel, and $C_3$ represents the lane line confidence C calculated for the edge line 62 that is third closest to the vehicle's lane of travel.

$$CL=(C_1+2\times C_2+4\times C_3)/7 \quad (6)$$

When the vehicle's lane of travel is identified as the leftmost lane of an expressway with three lanes in each direction as shown in FIG. 8, the left-side confidence CL is calculated by the following expression (7), where $C_1$ represents the lane line confidence C calculated for the edge line 62 that is the only lane line located on the left side of the vehicle's lane of travel.

$$CL=C_1 \quad (7)$$

The coefficients by which each lane line confidence C is multiplied in the above expressions (5) to (7) can be changed as appropriate. It is desirable to set the coefficients so that the lane line confidence C calculated for the lane line farther away from the vehicle's lane of travel is multiplied by a greater coefficient.

The left-side confidences CL thus calculated by the above expressions (5) to (7) have a value of 0 or more and 1 or less. The closer to 1 the calculated left-side confidence CL is, the higher the confidence of the position of the vehicle's lane of travel identified with respect to the left edge of the road is.

[Overall Confidence]

Finally, the overall confidence CT is calculated by adding the right-side confidence CR and left-side confidence CL calculated as described above. The overall confidence CT may be calculated by merely adding the right-side confidence CR and the left-side confidence CL, or may be calculated by giving a weight to either the right-side confidence CR or the left-side confidence CL. For example, the overall confidence CT is calculated by the following expression (8).

$$CT=(CR+CL)/2 \quad (8)$$

The overall confidence CT thus calculated by the above expression (8) has a value of 0 or more and 1 or less. The closer to 1 the calculated overall confidence CT is, the higher the total confidence of the position of the vehicle's lane of travel identified with respect to the right and left edges of the road is.

Next, in S15, the CPU 41 identifies the "recommended lane" that is a lane in which the vehicle is recommended to travel on the road on which the vehicle is currently traveling. Specifically, the CPU 41 identifies the recommended lane by the following process. In S15, the position of the "recommended lane" in the three-dimensional space generated in S11 is also identified.

[Identification of Recommended Lane]

Figure 9:
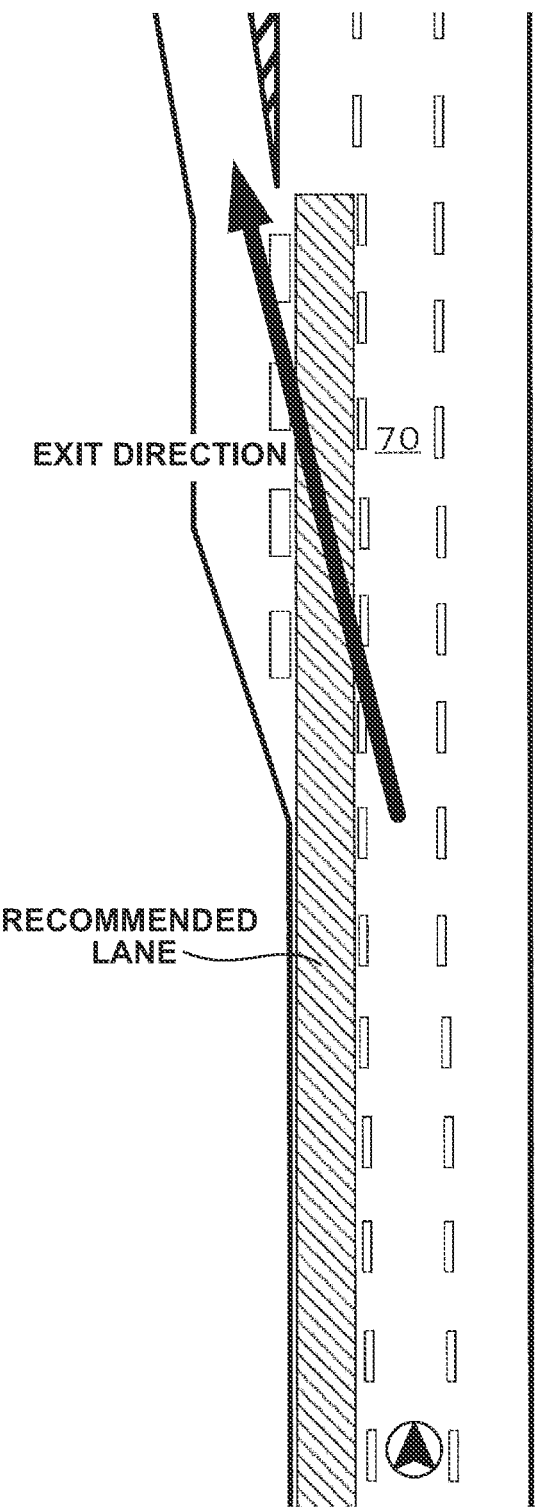
FIG. 9 shows an example of a recommended lane when passing through a guide branch point on an expressway.
Figure 10:
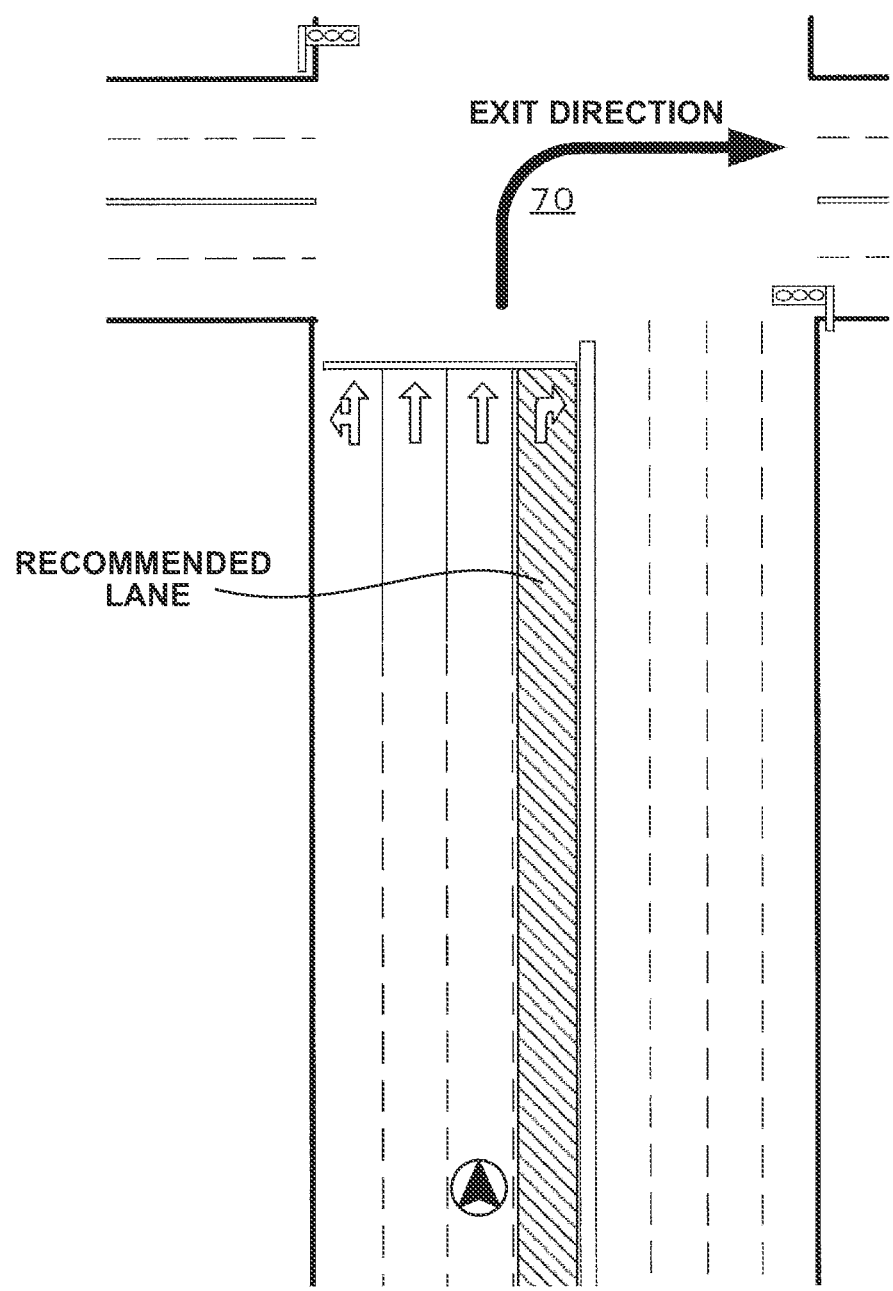
FIG. 10 shows an example of a recommended lane when passing through a guide branch point on a local road.

The CPU 41 identifies, as the recommended lane, the lane in which the vehicle needs to travel in order to pass through the guide branch point ahead of the vehicle in the exit direction (guide direction) along the guide route, based on the map information and the guide route. More specifically, the CPU 41 acquires the lane that allows the vehicle to pass through the guide branch point in the exit direction of the vehicle as the recommended lane. The link data 32 included in the map information stores the direction of travel of each lane, and the branch point data 34 included in the map information stores the shapes of branch points. The CPU 41 identifies the recommended lane using these pieces of information. For example, as shown in FIG. 9, when the exit direction (guide direction) at a guide branch point 70 ahead of the vehicle traveling on an expressway is a slightly leftward direction toward an exit road, the recommended lane is the leftmost one of the three lanes of the road on which the vehicle is traveling. As shown in FIG. 10, when the exit direction (guide direction) at a guide branch point 70 ahead of the vehicle traveling on a local road is the right direction, the recommended lane is the rightmost one of the four lanes of the road on which the vehicle is traveling, namely the right-turn lane. The number of recommended lanes is not limited to one, and may be two or more.

Subsequently, in S16, the CPU 41 determines whether the overall confidence CT calculated in S14 is equal to or higher than a first threshold. The first threshold is, for example, 0.8, although it can be set as appropriate.

When the CPU 41 determines that the overall confidence CT calculated in S14 is equal to or higher than the first threshold (S16: YES), the CPU 41 considers the vehicle's lane of travel identified in S13 to be sufficiently confident, and the routine proceeds to S17. On the other hand, when the CPU 41 determines that the overall confidence CT calculated in S14 is less than the first threshold (S16: NO), the routine proceeds to S20.

In S17, the CPU 41 generates a first guide object 71 to be displayed. When the confidence of the identification result of the lane in which the vehicle is currently traveling is high (when the identification result of the lane is confident), the first guide object is displayed in the first or second display mode having high guiding capability to guide the vehicle to the recommended lane. As shown in FIG. 3, in the first display mode, a guide image that provides guidance by distinguishing the recommended lane from the other lanes is displayed as the first guide object. In the second display mode, a guide image that provides guidance by distinguishing the recommended lane from the other lanes and that encourages to move to the recommended lane is displayed as the first guide object. When the confidence is high, the display may be switched between the first display mode and the second display mode based on the distance from the vehicle to the guide branch point or may be switched based on the positional relationship between the vehicle's lane of travel and the recommended lane, or the display may be given only in a predetermined one of the display modes. An example in which the first guide object is displayed in the first display mode will be particularly described below.

Figure 11:
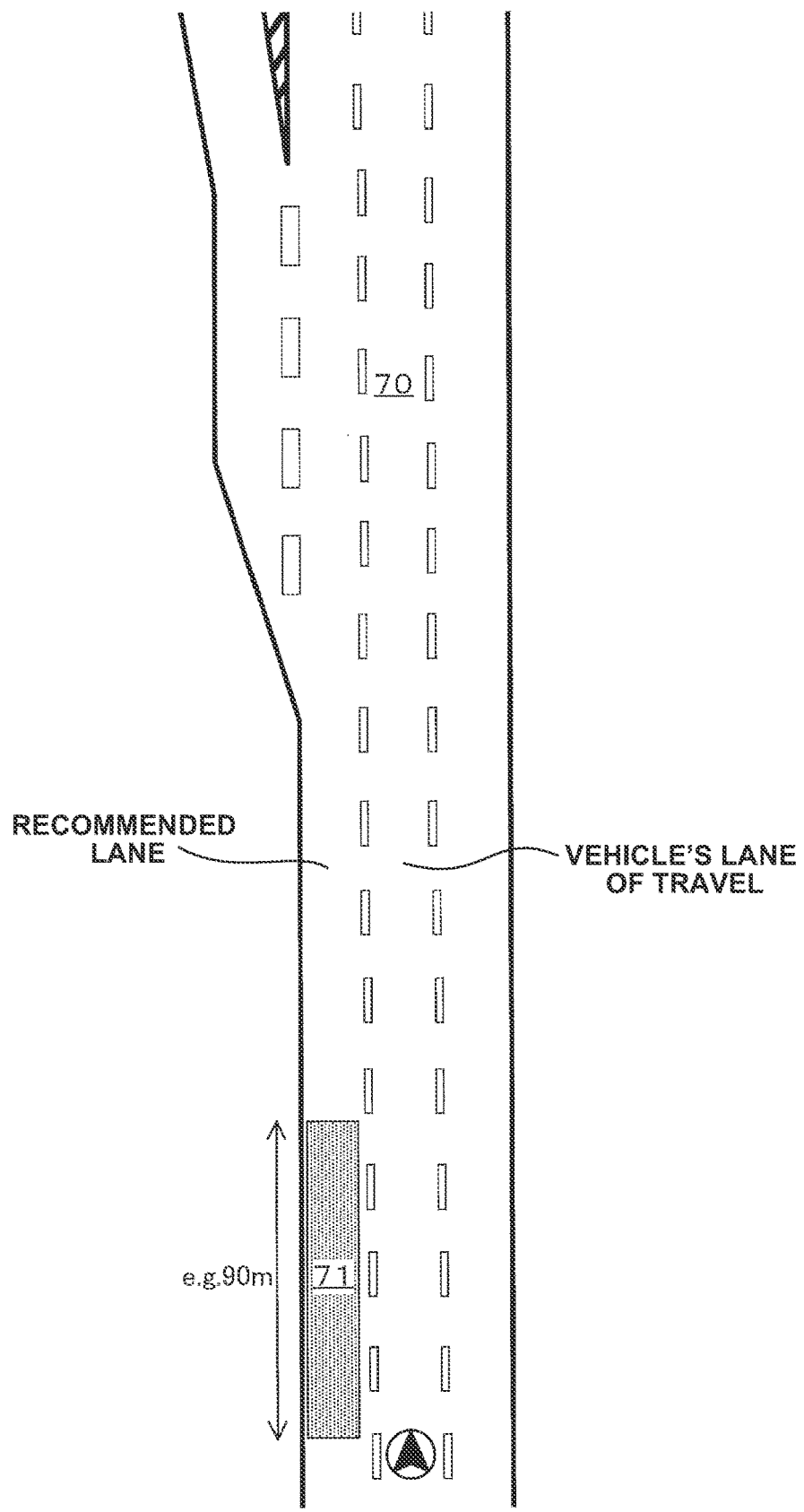
FIG. 11 shows an example of the first guide object.

As shown in FIG. 11, the first guide object 71 has a rectangular shape, the lateral length of the first guide object 71 is set to the width of the recommended lane, and the longitudinal length of the first guide object 71 is set to, for example, 90 m. The distance to the guide branch point may be drawn inside the first guide object 71. It is herein assumed that the first guide object 71 is a two-dimensional polygon and basically has no thickness. However, the first guide object 71 may be a three-dimensional polygon with a thickness. The shape of the first guide object 71 generated in S17 can be changed as appropriate. The first guide object 71 may have a shape other than a rectangle as long as the recommended lane can be distinguished from the other lanes.

In S17, the CPU 41 places the generated first guide object 71 in the three-dimensional space generated in S11. As shown in FIG. 11, the first guide object 71 is placed on the road surface of the recommended lane in the three-dimensional space, and is placed in the range form the current position of the vehicle to 90 m ahead. FIG. 11 shows an example in which the recommended lane is different from the vehicle's lane of travel. When the recommended lane is the same as the vehicle's lane of travel, the first guide object is placed in the vehicle's lane of travel. The first guide object is placed at the same height as the road surface. The routine then proceeds to S18.

In S18, the CPU 41 stores, as the size and shape of the guide object to be displayed on the liquid crystal display 15, the size and shape of the first guide object 71 that is visible in the three-dimensional space where the first guide object 71 is placed in S17 when seen in the direction of travel of the vehicle from the height of the front camera 19 at the current position of the vehicle. The size and shape of the guide object that are stored in S18 are the size and shape of the first guide object 71 that is visible when the first guide object 71 placed in the three-dimensional space is seen from the current point of view of the vehicle (more precisely, the front camera 19).

Thereafter, in S19, the CPU 41 estimates the position of the recommended lane in the landscape 52 displayed on the liquid crystal display 15, based on the current position of the vehicle and the position of the guide branch point in the three-dimensional space generated in S11 and the positions of the recommended lane and vehicle's lane of travel identified in S13 and S15. The CPU 41 then determines the range from the current position of the vehicle to 90 m ahead on the road surface of the estimated recommended lane to be the position where the first guide object 71 is to be displayed on the liquid crystal display 15. When the recommended lane is the same as the vehicle's lane of travel, the position where the first guide object 71 is to be displayed is on the road surface of the vehicle's lane of travel.

Subsequently, the routine proceeds to S5. In S5, the CPU 41 generates an image of the first guide object 71 with the size and shape determined in S18, transmits a control signal to the liquid crystal display 15, and draws the generated image of the first guide object 71 at the position (in the range) determined in S19 on the liquid crystal display 15.

[0069] In S20 that is performed when the CPU 41 determines that the overall confidence CT is less than the first threshold, the CPU 41 determines whether the confidence corresponding to the exit direction of the vehicle at the guide branch point out of the right-side confidence CR and left-side confidence CL calculated in S14 is equal to or higher than a second threshold. The second threshold is, for example, 0.8, although it can be set as appropriate. For example, the confidence corresponding to the exit direction of the vehicle is the right-side confidence CR when the vehicle exits to the right at the guide branch point, and is the left-side confidence CL when the vehicle exits to the left at the guide branch point. As shown in FIGS. 9 and 10, the recommended lane is basically present in the exit direction at the guide branch point. Therefore, for example, in the case where the exit direction at the guide branch point is the right direction, at least the positional relationship between the vehicle's lane of travel and the recommended lane is confident when the right-side confidence CR, namely the confidence of the position of the vehicle's lane of travel identified with respect to the right edge of the road, is high. That is, the position of the recommended lane in the landscape can be accurately estimated when superimposing the guide object on the actual view. On the other hand, in the case where the exit direction at the guide branch point is the left direction, at least the positional relationship between the vehicle's lane of travel and the recommended lane is confident when the left-side confidence CL, namely the confidence of the position of the vehicle's lane of travel identified with respect to the left edge of the road, is high. That is, the position of the recommended lane in the landscape can be accurately estimated when superimposing the guide object on the actual view.

When the CPU 41 determines that the confidence corresponding to the exit direction of the vehicle at the guide branch point out of the right-side confidence CR and left-side confidence CL calculated in S14 is equal to or higher than the second threshold (S20: YES), the CPU 41 considers at least the positional relationship between the vehicle's lane of travel identified in S13 and the recommended lane to be confident, and the routine proceeds to S17. In S17, as described above, the first guide object is displayed in the first or second display mode having high guiding capability to guide the vehicle to the recommended lane.

On the other hand, when the CPU 41 determines that the confidence corresponding to the exit direction of the vehicle at the guide branch point out of the right-side confidence CR and left-side confidence CL calculated in S14 is less than the second threshold (S20: NO), the CPU 41 considers the vehicle's lane of travel identified in S13 to be not confident, and the routine proceeds to S21.

In S21, the CPU 41 generates first guide objects 72 to 74 to be displayed. When the confidence of the identification result of the lane in which the vehicle is currently traveling is low (when the identification result of the lane is not confident), the first guide objects are displayed in the third display mode having low guiding capability to guide the vehicle to the recommended lane. As shown in FIG. 3, in the third display mode, a guide image providing guidance on the direction toward the recommended lane (that is also the exit direction at the guide branch point) is displayed as the first guide object. The direction toward the recommended lane is not the direction relative to the current position of the vehicle, but the direction in which the recommended lane is located on the road. Therefore, for example, when the leftmost lane is the recommended lane as shown in FIG. 9, a guide image showing the left direction is displayed as the first guide object even if the vehicle is traveling in the recommended lane.

Figure 12:
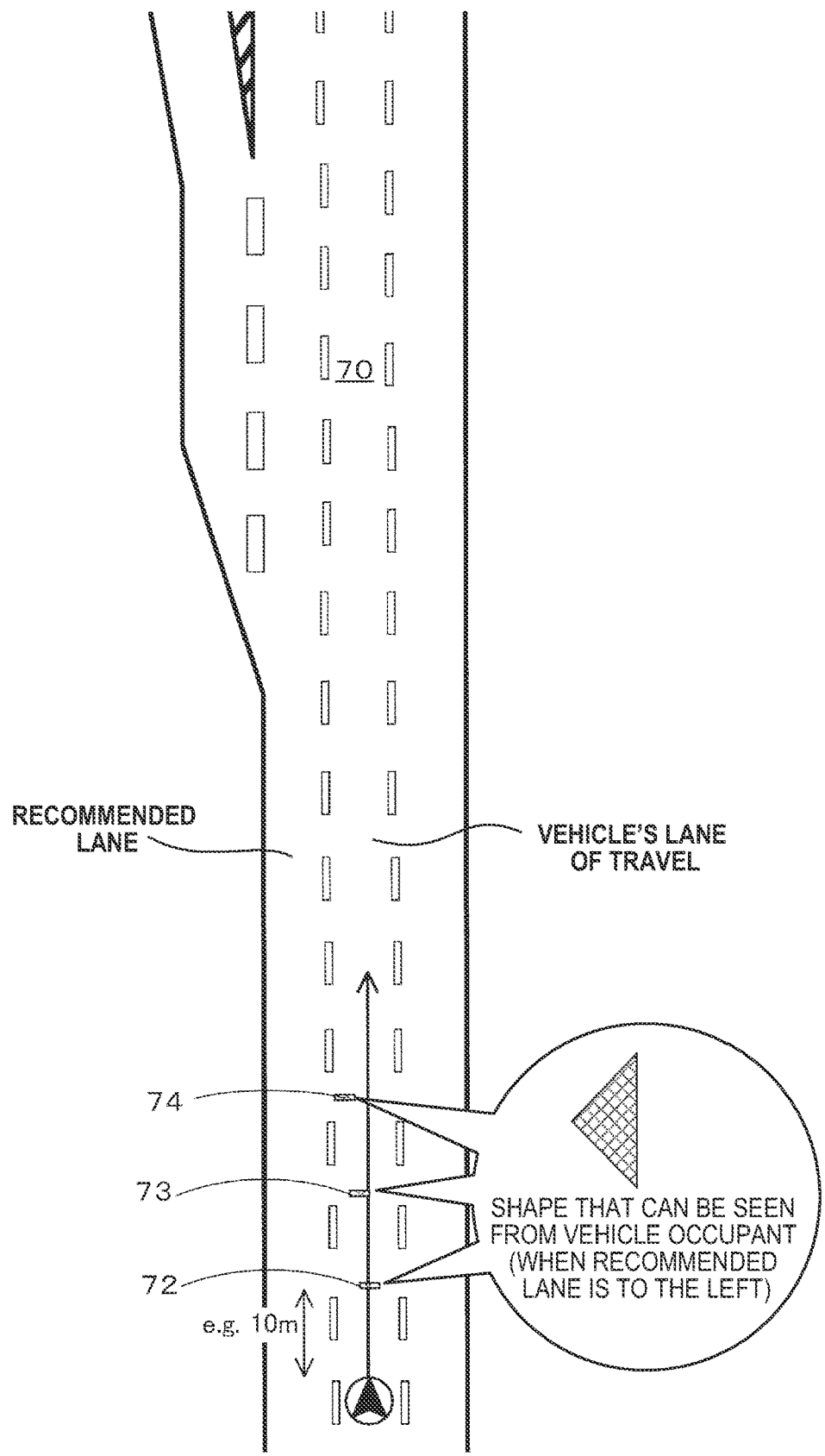
FIG. 12 shows an example of the first guide object.
Figure 13:
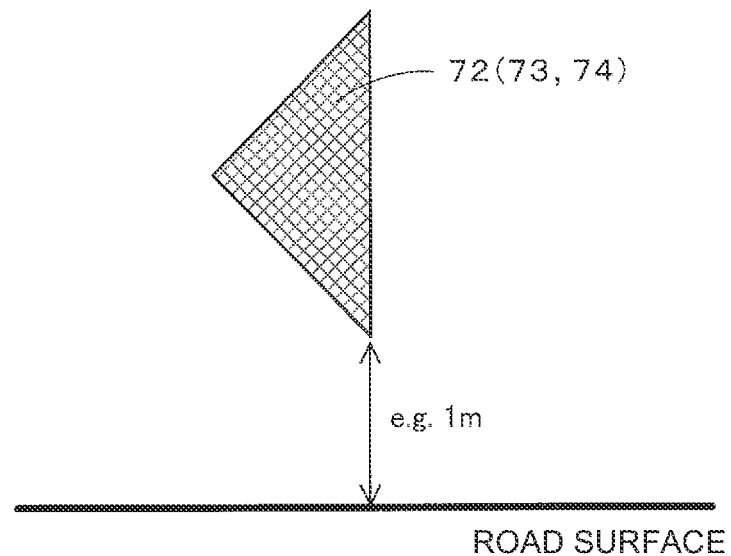
FIG. 13 shows an example of the first guide object.

The first guide objects 72 to 74 are arrows indicating the direction toward the recommended lane (that is also the exit direction at the guide branch point). Particularly, the CPU 41 generates three arrows having an isosceles triangular shape, as shown in FIGS. 12 and 13. When the recommended lane is located to the right (that is, the exit direction at the guide branch point is the right direction), the first guide objects 72 to 74 are arrows indicating the right direction. When the recommended lane is located to the left (that is, the exit direction at the guide branch point is to the left), the first guide objects 72 to 74 are arrows indicating the left direction. It is herein assumed that the first guide objects 72 to 74 are two-dimensional polygons and basically have no thickness. However, the first guide objects 72 to 74 may be three-dimensional polygons with a thickness. The shape of the first guide objects 72 to 74 generated in S21 can be changed as appropriate. The first guide objects 72 to 74 may have a shape other than an arrow as long as their shape can indicate the direction toward the recommended lane. The number of arrows need not necessarily be three, and may be only one.

In S21, the CPU 41 places the generated first guide objects 72 to 74 in the three-dimensional space generated in S11. The first guide objects 72 to 74 are placed at the following positions in the three-dimensional space. As shown in FIG. 12, the first guide objects 72 to 74 that are three arrows are placed at predetermined intervals at the position a predetermined distance ahead (e.g., 10 m ahead) of the current position of the vehicle above the road on which the vehicle is currently traveling in the three-dimensional space. Particularly, the three first guide objects 72 to 74 are placed in such a manner that the distance from the current position of the vehicle to the first guide object 72 located closest to the vehicle out of the first guide objects 72 to 74 is equal to the fixed predetermined distance (e.g., 10 m). The first guide objects 72 to 74 have an isosceles triangular shape and are placed parallel to a direction crossing the direction of travel of the vehicle (that is, such that the front sides of the first guide objects 72 to 74 face the vehicle). Each of the first guide objects 72 to 74 indicates the direction toward the recommended lane by the direction of the apex with respect to the base. When the recommended lane is located on the left side of the road, the first guide objects 72 to 74 are in the shape of an isosceles triangle with its apex pointing to the left, as shown in FIG. 12. The intervals of the three first guide objects 72 to 74 are, for example, 10 m. However, the intervals can be changed as appropriate. The three first guide objects 72 to 74 are not arranged parallel to the course of the vehicle (that is, the direction of travel of the road), but are arranged gradually away from the course of the vehicle such that the closer to the guide branch point 70 the arrow is to be seen, the more in the direction toward the recommended lane (the more to the left in FIG. 12) the arrow is placed with respect to the course of the vehicle. The first guide objects 72 to 74 are also placed on the condition that two or more of the first guide objects 72 to 74 do not overlap each other by a predetermined percentage (e.g., 20%) or more when seen from the vehicle. The first guide objects 72 to 74 may be arranged parallel to the direction of travel. Regarding the vertical positions of the first guide objects 72 to 74, as shown in FIG. 13, the first guide objects 72 to 74 are placed such that their lower ends are at a predetermined distance (e.g., 1 m) away from the road surface.

In S22, the CPU 41 stores, as the size and shape of the guide objects to be displayed on the liquid crystal display 15, the size and shape of the first guide objects 72 to 74 that are visible in the three-dimensional space where the first guide objects 72 to 74 are placed in S21 when seen in the direction of travel of the vehicle from the height of the front camera 19 at the current position of the vehicle. The size and shape of the guide objects that are stored in S22 are the size and shape of the first guide objects 72 to 74 that are visible when the first guide objects 72 to 74 placed in the three-dimensional space are seen from the current point of view of the vehicle (more precisely, the front camera 19).

Thereafter, in S23, the CPU 41 estimates the future course of the vehicle in the landscape 52 displayed on the liquid crystal display 15, based on the current position of the vehicle and the position of the guide branch point in the three-dimensional space generated in S11. The CPU 41 then determines the range along the estimated course to be the position where the first guide objects 72 to 74 are to be displayed on the liquid crystal display 15.

Subsequently, the routine proceeds to S5. In S5, the CPU 41 generates an image of the first guide objects 72 to 74 with the size and shape determined in S22, transmits a control signal to the liquid crystal display 15, and draws the generated image of the first guide objects 72 to 74 at the position (in the range) determined in S23 on the liquid crystal display 15.

Figure 14:
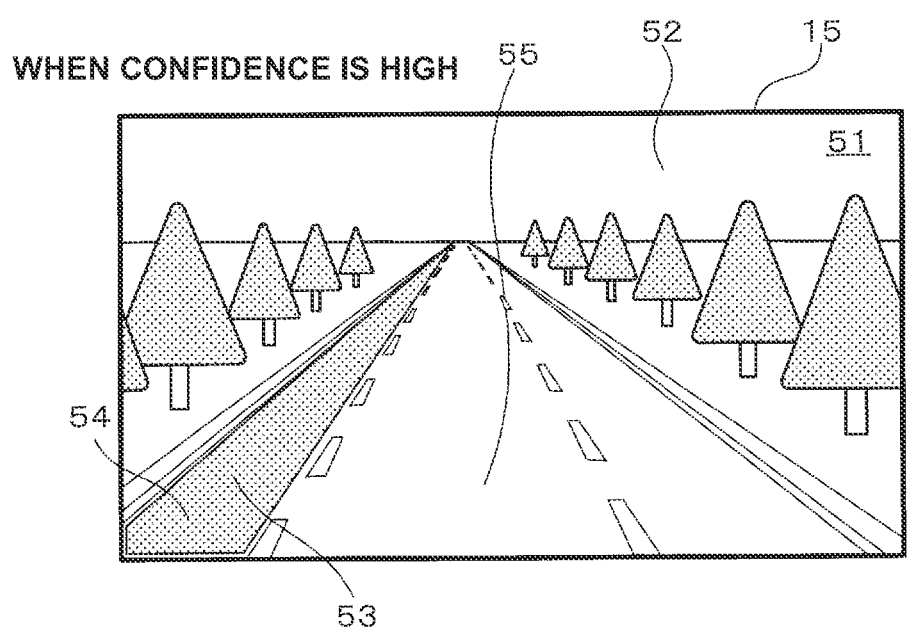
FIG. 14 shows an example of the first guide object displayed on the liquid crystal display.
Figure 15:
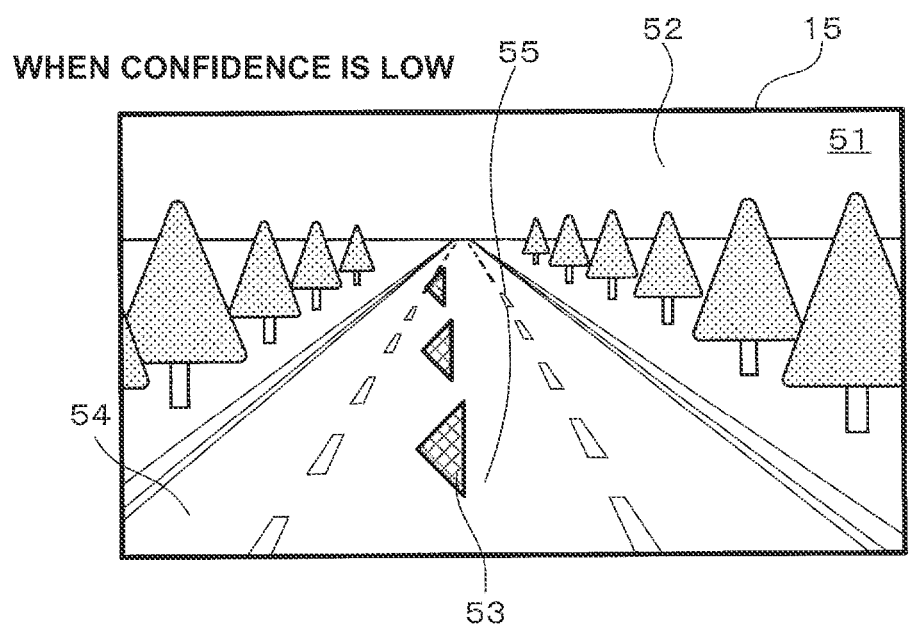
FIG. 15 shows an example of the first guide object displayed on the liquid crystal display.

As a result of the above process, when the distance from the vehicle to the guide branch point is less than the guidance start distance and is equal to or greater than the exit direction guidance start distance, the travel guidance screen 51 that is displayed on the liquid crystal display 15 as the vehicle travels varies depending on the confidence of the identification result of the lane in which the vehicle is currently traveling, as shown in FIG. 14 or 15.

For example, when the confidence of the identification result of the lane in which the vehicle is currently traveling is high (when the identification result of the lane is confident), such a travel guidance screen 51 as shown in FIG. 14 is displayed on the liquid crystal display 15.

Specifically, the "image 53 of the first guide object that distinguishes the recommended lane from the other lanes" is displayed. As shown in FIG. 14, the "image 53 of the first guide object that distinguishes the recommended lane from the other lanes" is the image 53 of the first guide object displayed superimposed on the road surface of the recommended lane 54 (S17 to S19). This allows the vehicle occupant to become clearly aware of the presence and position of the recommended lane 54. By clearly identifying which lane is the recommended lane 54 in the landscape 52, guidance with high guiding capability to guide the vehicle to the recommended lane can be provided.

On the other hand, when the confidence of the identification result of the lane in which the vehicle is currently traveling is low (when the identification result of the lane is not confident), such a travel guidance screen 51 as shown in FIG. 15 is displayed on the liquid crystal display 15.

Specifically, the "image 53 of the first guide object indicating the direction toward the recommended lane" is displayed. As shown in FIG. 15, the "image 53 of the first guide object indicating the direction toward the recommended lane" is the image 53 of the first guide object that is displayed superimposed above the road surface ahead in the direction of travel of the vehicle rather than being displayed superimposed on the road surface of the recommended lane 54 (S21 to S23). Rather than clearly indicating the position of the recommended lane 54 to the occupant, only the direction in which the recommended lane is present is indicated. This provides guidance with low guiding capability to guide the vehicle to the recommended lane. The possibility that wrong guidance is provided can be reduced or prevented even in a situation where the position of the recommended lane in the landscape 52 cannot be accurately identified.

As described above, whether the travel guidance screen 51 of FIG. 14 or the travel guidance screen 51 of FIG. 15 is displayed when the distance from the vehicle to the guide branch point is less than the guidance start distance and is equal to or greater than the exit direction guidance start distance depends on the current confidence of the identification result of the vehicle's lane of travel. Accordingly, for example, the display is switched to the travel guidance screen 51 of FIG. 15 when the vehicle enters a section with faint lane lines while the travel guidance screen 51 of FIG. 14 is being displayed on the liquid crystal display 15, and the confidence of the identification result of the vehicle's lane of travel decreases. Similarly, the display is switched to the travel guidance screen 51 of FIG. 14 when the confidence of the identification result of the vehicle's lane of travel increases while the travel guidance screen 51 of FIG. 15 is being displayed on the liquid crystal display 15. However, the display need not necessarily be switched even when the confidence of the identification result of the vehicle's lane of travel changes during traveling.

When the distance from the vehicle to the guide branch point subsequently becomes less than the exit direction guidance start distance (300 m for an expressway), the image 57 of the second guide object, namely arrows indicating the exit direction at the guide branch point, will be newly displayed instead of the image 53 of the first object (see FIG. 18), as will be described later.

Figure 16:
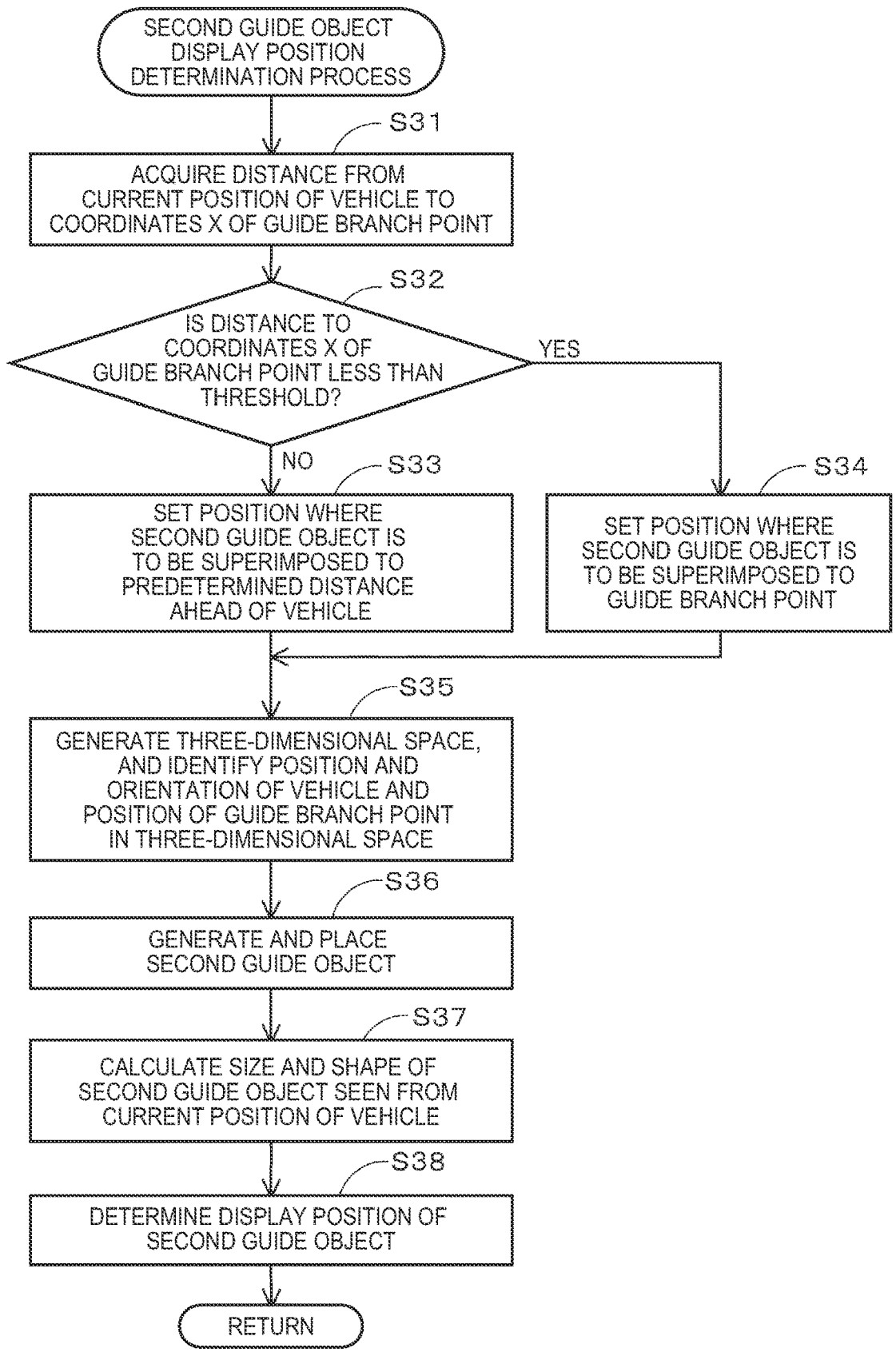
FIG. 16 is a flowchart of a sub-process program of a second guide object display position determination process.

Next, a sub-process of the second guide object display position determination process that is performed in S6 will be described with reference to FIG. 16. FIG. 16 is a flowchart of a sub-process program of the second guide object display position determination process.

Figure 17:
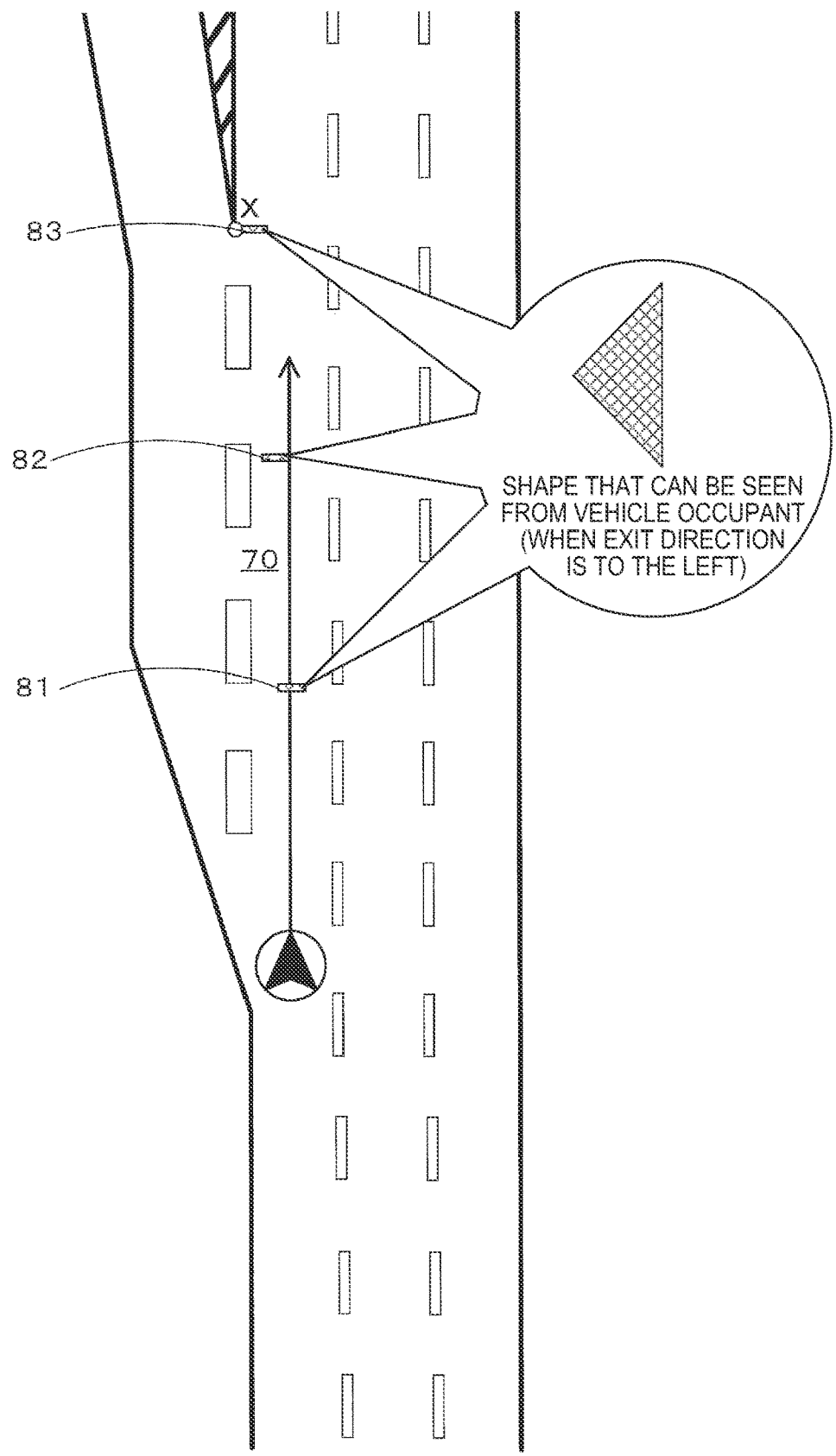
FIG. 17 shows an arrangement example of the second guide objects.

First, in S31, the CPU 41 acquires the distance from the current position of the vehicle to the coordinates X of the next guide point along the guide route. For example, as shown in FIG. 17, the vertex of a gore area located at the branch on an expressway is the coordinates X of the guide branch point.

Next, in S32, the CPU 41 determines whether the distance to the coordinates X of the guide branch point acquired in S31 is less than a predetermined threshold. The timing at which the distance to the coordinates X of the guide branch point becomes equal to the threshold is the timing at which at least a part of the image of the guide object displayed on the liquid crystal display 15 at a fixed relative position with respect to the vehicle as in S33 described later (in the first mode) is superimposed on the coordinates X of the guide branch point, that is, the timing at which at least part of the guide object is seen superimposed on the guide branch point by the vehicle occupant. This will be described in detail later.

When the CPU 41 determines that the distance to the coordinates X of the guide branch point acquired in S31 is less than the threshold (S32: YES), the routine proceeds to S34. On the other hand, when the CPU 41 determines that the distance to the coordinates X of the guide branch point acquired in S31 is equal to or greater than the threshold (S32: NO), the routine proceeds to S33.

In S33, the CPU 41 sets the "position where the second guide object is to be superimposed on the landscape" to the position where the second guide object displayed at a fixed position relative to the vehicle is seen superimposed by the vehicle occupant (i.e., to the position for display in the first mode). Specifically, the CPU 41 sets the position where the second guide object is to be superimposed (placed) to the position a predetermined distance ahead (e.g., 10 m ahead) of the current position of the vehicle.

In S34, the CPU 41 sets the "position where the second guide object is to be superimposed on the landscape" to the position where the second guide object displayed at a fixed position relative to the guide branch point is seen superimposed by the vehicle occupant (i.e., to the position for display in the second mode). Specifically, the CPU 41 sets the position where the second guide object is to be superimposed on the landscape to the position where at least a part of the guide object is seen superimposed on the guide branch point (including the area around the guide branch point) by the vehicle occupant.

Thereafter, in S35, the CPU 41 generates a three-dimensional space corresponding to the area around the current position of the vehicle (particularly in front of the vehicle in the direction of travel of the vehicle). The CPU 41 also identifies the current position and orientation of the vehicle and the position of the guide branch point in the generated three-dimensional space. Since S35 is similar to S11, detailed description thereof will be omitted.

Subsequently, in S36, the CPU 41 generates second guide objects 81 to 83 to be displayed on the liquid crystal display 15. The shape of the second guide objects 81 to 83 is the same as that of the first guide objects 72 to 74 displayed in the third display mode described above. That is, the second guide objects 81 to 83 are arrows indicating the exit direction at the guide branch point located ahead in the direction of travel of the vehicle. The CPU 41 generates three arrows having an isosceles triangular shape as shown in FIGS. 12 and 13. When the guide route is a route with a right turn at the guide branch point located ahead in the direction of travel, the CPU 41 generates arrows indicating the right direction. When the guide route is a route with a left turn at the guide branch point located ahead in the direction of travel, the CPU 41 generates arrows indicating the left direction. It is herein assumed that the second guide objects 81 to 83 are two-dimensional polygons and basically have no thickness. However, the second guide objects 81 to 83 may be three-dimensional polygons with a thickness. The shape of the second guide objects 81 to 83 generated in S36 can be changed as appropriate. The second guide objects 81 to 83 may have a shape other than an arrow as long as their shape can indicate the exit direction at the guide branch point. The number of arrows need not necessarily be three, and may be only one.

In S36, the CPU 41 places the generated second guide objects 81 to 83 in the three-dimensional space generated in S35. The positions where the second guide objects 81 to 83 are to be placed in the three-dimensional space are determined based on the "position where the second guide object is to be superimposed in the landscape" set in S33 or S34.

For example, when the "position where the second guide object is to be superimposed on the landscape" is set to the position a predetermined distance ahead (e.g., 10 m ahead) of the current position of the vehicle in S33, the second guide objects 81 to 83 are placed at the same positions as the first guide objects 72 to 74 displayed in the third display mode (FIG. 12). That is, the second guide objects 81 to 83 that are three arrows are placed at predetermined intervals at the position the predetermined distance ahead of the current position of the vehicle above the road on which the vehicle is currently traveling in the three-dimensional space. The three second guide objects 81 to 83 are placed at positions along the future course of the vehicle. Since S36 is similar to that in S21, detailed description thereof will be omitted.

When the "position where the second guide object is to be superimposed in the landscape" is set to the position where at least a part of the second guide object is seen superimposed on the guide branch point in S34, the second guide objects 81 to 83 that three arrows are placed at predetermined intervals at the position of the guide branch point above the road on which the vehicle is currently traveling in the three-dimensional space as shown in FIG. 17. The three second guide objects 81 to 83 are placed at positions along the future course of the vehicle. FIG. 17 shows an arrangement example of the second guide objects when a set guide route is a route exiting in the left direction at the guide branch point 70 on an expressway. Specifically, as shown in FIG. 17, the three second guide objects 81 to 83 are arranged at regular intervals along the course of the vehicle. Particularly, the three second guide objects 81 to 83 are placed in such a manner that the left end (right end when the arrows indicate the right direction) of the second guide object 83 located farthest away from the vehicle in the direction of travel out of the three second guide objects 81 to 83 matches (matches in the horizontal direction) the coordinates X of the guide branch point. The coordinates X of the guide branch point are identified from the map information in the navigation device 1. However, the coordinates X of the guide branch point may be identified by performing image recognition on the image captured by the front camera 19. In that case, the coordinates X of the guide branch point are set to the vertex of the gore area located at the branch. The intervals of the three second guide objects 81 to 83 are, for example, 10 m. However, the intervals can be changed as appropriate. The three second guide objects 81 to 83 are not arranged parallel to the course of the vehicle, but are arranged gradually away from the course of the vehicle such that the closer to the guide branch point 70 the arrow is to be seen, the more in the direction of travel at the guide branch point 70 (the more to the left in FIG. 17) the arrow is placed with respect to the course of the vehicle. The second guide objects 81 to 83 are also placed on the condition that two or more of the second guide objects 81 to 83 do not overlap each other by a predetermined percentage (e.g., 20%) or more when seen from the vehicle. The second guide objects 81 to 83 may be arranged parallel to the direction of travel. Regarding the vertical positions of the second guide objects 81 to 83, the second guide objects 81 to 83 are placed such that their lower ends are at a predetermined distance (e.g., 1 m) away from the road surface as shown in FIG. 13.

Thereafter, in S37, the CPU 41 stores, as the size and shape of the guide objects to be displayed on the liquid crystal display 15, the size and shape of the second guide objects 81 to 83 that are visible in the three-dimensional space where the second guide objects 81 to 83 are placed in S36 when seen in the direction of travel of the vehicle from the height of the front camera 19 at the current position of the vehicle. The size and shape of the guide objects that are stored in S37 are the size and shape of the second guide objects 81 to 83 that are visible when the second guide objects 81 to 83 placed in the three-dimensional space are seen from the current point of view of the vehicle (more precisely, the front camera 19).

Thereafter, in S38, the CPU 41 estimates the future course of the vehicle in the landscape 52 displayed on the liquid crystal display 15, based on the current position of the vehicle and the position of the guide branch point in the three-dimensional space generated in S35. The CPU 41 then determines the range along the estimated course to be the position where the second guide objects 81 to 83 are to be displayed on the liquid crystal display 15.

Subsequently, the routine proceeds to S7. In S7, the CPU 41 generates an image of the second guide objects 81 to 83 with the size and shape determined in S37, transmits a control signal to the liquid crystal display 15, and draws the generated image of the second guide objects 81 to 83 at the position (in the range) determined in S38 on the liquid crystal display 15.

Figure 18:
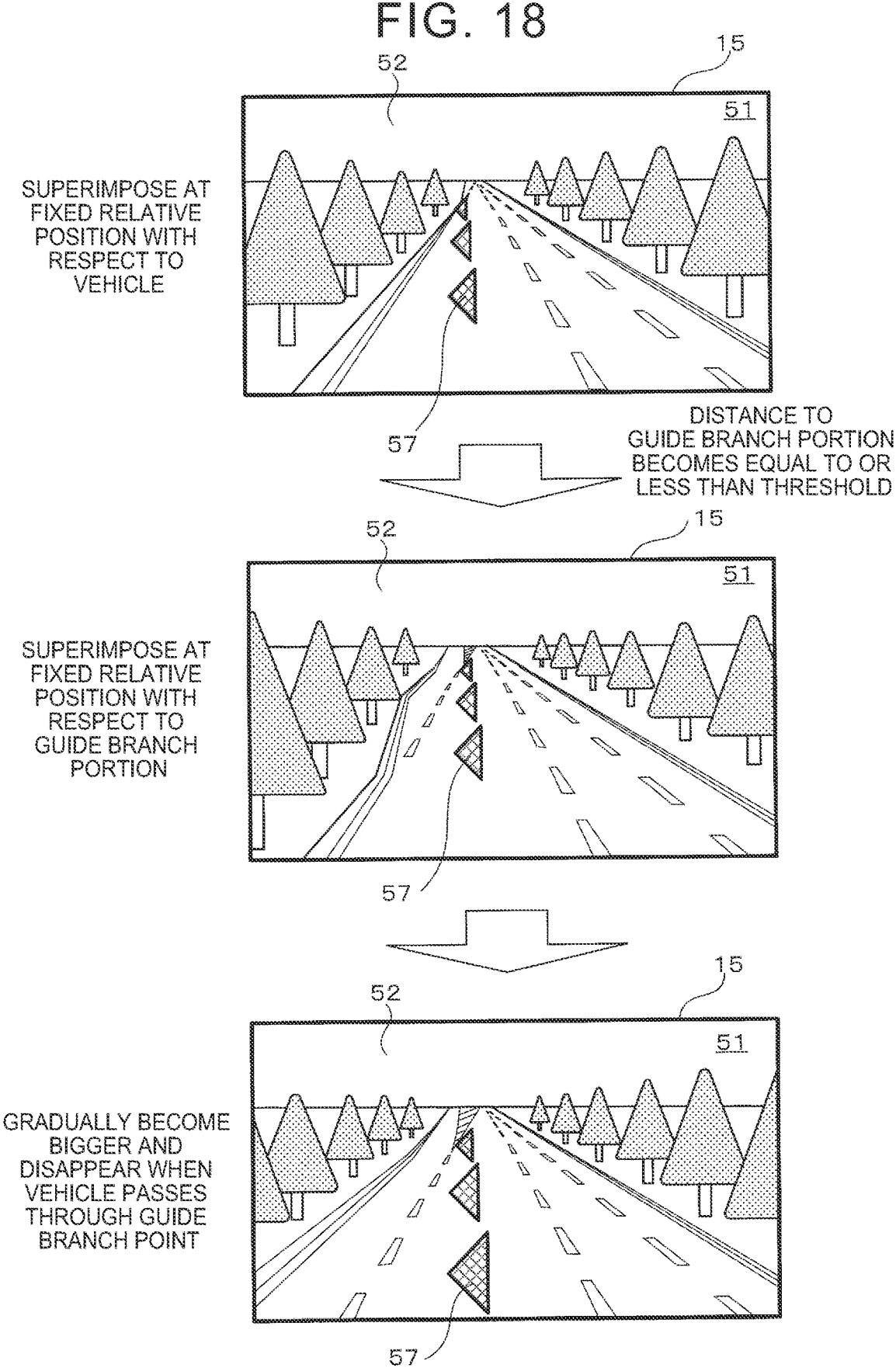
FIG. 18 shows how the second guide object displayed on the liquid crystal display changes as a vehicle travels.

As a result, such a travel guidance screen 51 as shown in FIG. 18 is displayed on the liquid crystal display 15 as the vehicle travels. First, as soon as the distance from the vehicle to the guide branch point becomes less than the exit direction guidance start distance (e.g., 300 m), display of the image 53 of the first guide object shown in FIGS. 14 and 15 is stopped, and instead, the image 57 of the second guide object is displayed superimposed on the landscape 52 ahead in the direction of travel of the vehicle as captured by the front camera 19 in the first mode. The position where the image 57 of the second guide object is first superimposed is a position relatively fixed with respect to the current position of the vehicle and is, for example, 10 m ahead of the vehicle. In the first mode, the image 57 of the second guide object displayed superimposed at a fixed relative position with respect to the vehicle is seen by the vehicle occupant. The image 57 of the second guide object is displayed superimposed at a relatively fixed position with respect to the current position of the vehicle for a while after that. Since the relative position with respect to the vehicle is fixed, the display size of the image 57 of the second guide object image is also fixed.

Thereafter, as the vehicle approaches the guide branch point and the image 57 of the second guide object displayed superimposed at the relatively fixed position with respect to the current position of the vehicle is superimposed (reaches) the guide branch point (that is, when the CPU 41 determines YES for the first time in S32), the display is switched from the first mode to the second mode. The image 57 of the second guide object is thus displayed superimposed at a fixed relative position with respect to the guide branch point in the landscape 52. That is, the image 57 of the second guide object is fixedly displayed at a position superimposed on the guide branch point. The switching from the first mode to the second mode is not performed in order to change the guide object to be displayed. The guide object to be displayed is the same before and after the switching. That is, only the display mode (mode that is seen by the vehicle occupant) is switched from the first mode to the second mode, and the object to be displayed does not change. In the second mode, the image 57 of the second guide object displayed superimposed at a fixed relative position with respect to the guide branch point is seen by the vehicle occupant. Thereafter, as the vehicle approaches the guide branch point, the image 57 of the second guide object gradually becomes larger. The transmittance of the image 57 of the second guide object also gradually increases, so that the image 57 of the second guide object disappears from the liquid crystal display 15 when the vehicle passes through the guide branch point (S9).

As described in detail above, with the navigation device 1 and the computer program that is executed by the navigation device 1 according to the first embodiment, the recommended lane in which the vehicle is currently traveling is acquired (S15), the lane in which the vehicle is currently traveling on the road on which the vehicle is currently traveling is identified (S13), the confidence indicating how confident the identification result of the specified lane of travel is acquired (S14), and the guide object providing guidance on the recommended lane is displayed in a display mode according to the confidence (S5). This allows accurate guidance to be provided when the confidence of the lane of travel is high, and reduces or eliminates the possibility that a disadvantage may be caused to the vehicle occupant even when the confidence of the lane of travel is low.

As the confidence increases, the guide object is displayed in the display mode having higher guiding capability to guide the vehicle to the recommended lane. Therefore, guidance capable of accurately guiding the vehicle to the recommended lane is provided when the confidence of the lane of travel is high. Moreover, the possibility that a disadvantage may be caused to the vehicle occupant can be reduced or eliminated even when the confidence of the lane of travel is low.

When the confidence is lower than the threshold, an image indicating the direction toward the recommended lane is displayed as a guide object. When the confidence is higher than the threshold, an image distinguishing the recommended lane from the other lanes is displayed as a guide object. Therefore, when the confidence of the lane of travel is high, the guide object allows the vehicle occupant to become accurately aware of the recommended lane. When the confidence is low, the recommended lane is intentionally not distinguished from the other lanes to reduce or eliminate the possibility of giving wrong guidance.

An image superimposed on the road surface of the recommended lane is displayed as the image distinguishing the recommended lane from the other lanes. Therefore, when the confidence of the lane of travel is high, the vehicle occupant can be accurately aware of the recommended lane by the position where the image is superimposed.

The lane lines around the vehicle and the edges of the road on which the vehicle is current traveling are detected based on the captured image of the area around the vehicle, the number of lanes between each road edge and the lane in which the vehicle is currently traveling is estimated based on the detection results of the lane lines and road edges, and the lane of travel is identified based on the estimation results (S12, S13). Therefore, the lane of travel can be accurately identified based on the detection results of the lane lines and road edges.

The confidence includes: the right-side confidence that is the confidence when the position of the lane of travel with respect to the right edge of the road is identified based on the detection results of the lane lines and road edge located on the right side of the vehicle in the direction of travel; and the left-side confidence that is the confidence when the position of the lane of travel with respect to the left edge of the road is identified based on the detection results of the lane lines and road edge located on the left side of the vehicle in the direction of travel. The guide object is displayed in the display mode according to the overall confidence calculated based on the right-side confidence and the left-side confidence. Therefore, the total confidence indicating whether the identification result of the lane of travel is confident regardless of whether the lane of travel is on the right side or left side of the road can be calculated based on the confidences of the lane of travel with respect to the right and left road edges. As a result, appropriate guidance can be provided according to the total confidence.

When the guide branch point is present within a predetermined guidance start distance ahead in the direction of travel of the vehicle, the lane corresponding to the exit direction of the vehicle at the guide branch point is acquired as a recommended lane (S15). The confidence includes: the right-side confidence that is the confidence when the position of the lane of travel with respect to the right edge of the road is identified based on the detection results of the lane lines and road edge located on the right side of the vehicle in the direction of travel; and the left-side confidence that is the confidence when the position of the lane of travel with respect to the left edge of the road is identified based on the detection results of the lane lines and road edge located on the left side of the vehicle in the direction of travel. The guide object is displayed in the display mode according to the confidence corresponding to the exit direction of the vehicle at the guide branch point. Therefore, even when the identification result of the position of the lane of travel is not confident enough, accurate guidance can be provided when at least the positional relationship between the lane of travel and the recommended lane is confident.

The right-side confidence is calculated based on at least one of the detection results obtained by detecting the lane lines on the right side of the vehicle in the direction of travel by image recognition of the captured image of the area around the vehicle, namely based on at least one of the following: whether any lane lines have been detected, the color of the detected lane lines, the type of the detected lane lines, and the tilt of the detected lane lines with respect to the direction of travel of the road. The left-side confidence is calculated based on at least one of the detection results obtained by detecting the lane lines on the left side of the vehicle in the direction of travel by image recognition of the captured image of the area around the vehicle, namely based on at least one of the following: whether any lane lines have been detected, the color of the detected lane lines, the type of the detected lane lines, and the tilt of the detected lane lines with respect to the direction of travel of the road. Therefore, the confidence based on the right and left road edges can be accurately calculated.

The right-side confidence and the left-side confidence are calculated based more on the detection results of the lane lines far away from the vehicle than on the detection results of the lane lines near the vehicle. Therefore, the confidence is calculated based on determination as to whether an object that is difficult to perceive has been able to be perceived rather than an object that is easy to perceive. The confidence can thus be more accurately calculated.

Second Embodiment

Next, a superimposed image display device according to a second embodiment will be described with reference to FIGS. 19 and 20. In the following description, the same signs as those of the configurations of the superimposed image display device according to the first embodiment shown in FIGS. 1 to 18 represent the portions that are the same as or correspond to the configurations of the superimposed image display device according to the first embodiment.

The schematic configuration of the superimposed image display device according to the second embodiment is substantially the same as that of the superimposed image display device according to the first embodiment. Various control processes are substantially the same as those of the superimposed image display device according to the first embodiment.

The superimposed image display device according to the first embodiment is different from the superimposed image display device according to the second embodiment in the following point. The superimposed image display device according to the first embodiment displays a guide object superimposed on the landscape around the vehicle by displaying an image captured by the front camera 19 on the liquid crystal display 15 of the navigation device 1 and further displaying the guide object on the liquid crystal display 15. However, the superimposed image display device according to the second embodiment uses a head-up display system as a unit for displaying an image superimposed on the landscape around the vehicle.

Hereinafter, a schematic configuration of the superimposed image display device according to the second embodiment will be described with reference to FIG. 19. FIG. 19 shows a schematic configuration of a superimposed image display device 101 according to the second embodiment.

Figure 19:
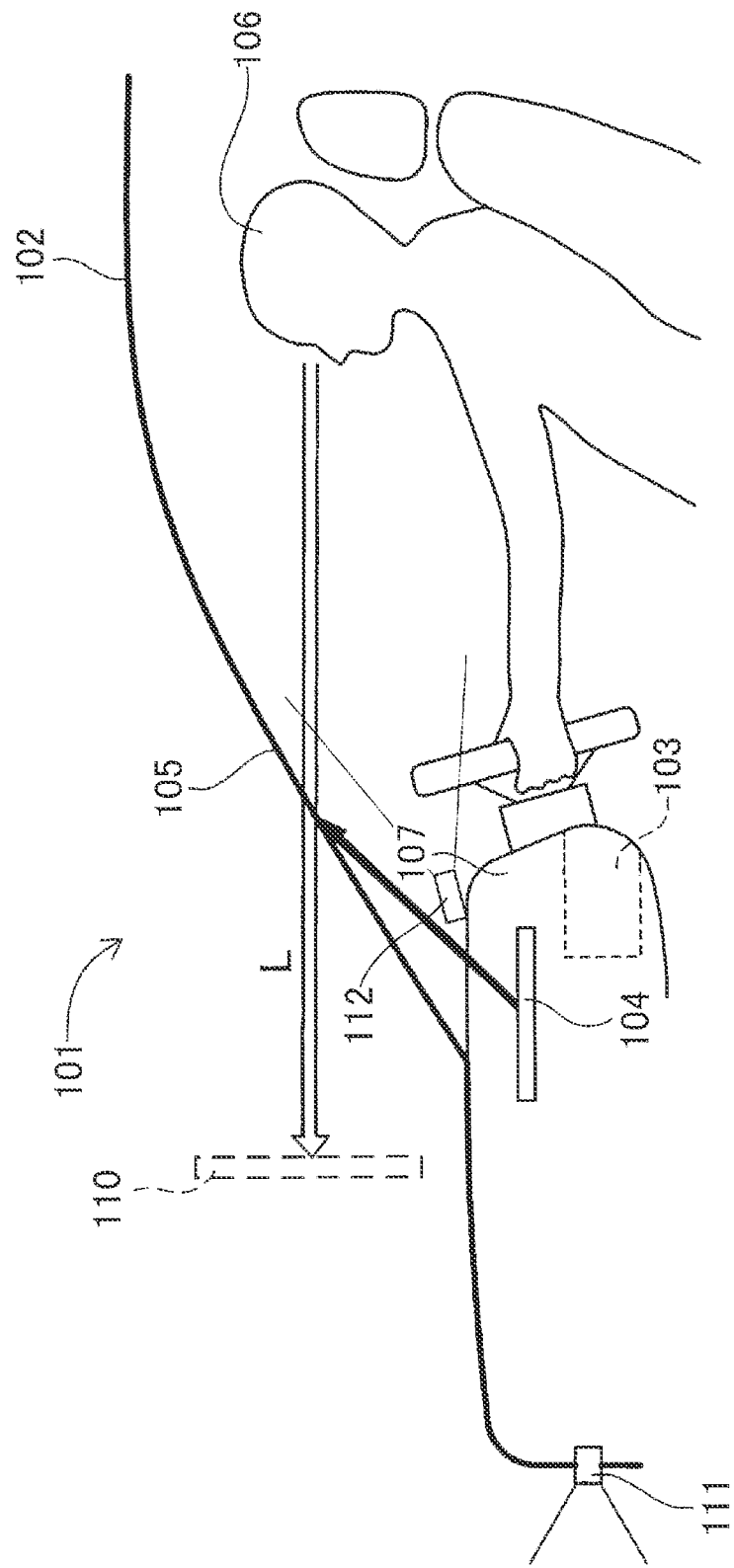
FIG. 19 is a schematic configuration diagram of a superimposed image display device according to a second embodiment.

As shown in FIG. 19, the superimposed image display device 101 basically includes a navigation device 103 mounted on a vehicle 102, and a front display 104 mounted on the vehicle 102 and connected to the navigation device 103. The front display 104 functions as a head-up display together with a windshield 105 of the vehicle 102, and serves as an information providing unit that provides various kinds of information to an occupant 106 of the vehicle 102.

The front display 104 is a liquid crystal display installed inside a dashboard 107 of the vehicle 102 and having a function to display an image on an image display surface on the front side of the liquid crystal display. For example, a cold cathode fluorescent lamp (CCFL) or a white light-emitting diode (LED) is used as a backlight. The front display 104 may be a combination of an organic electroluminescent (EL) display or a liquid crystal projector, instead of the liquid crystal display.

The front display 104 functions as a head-up display together with the windshield 105 of the vehicle 102. The front display 104 is configured to reflect an image output from the front display 104 on the windshield 105 in front of the driver's seat so that the occupant 106 of the vehicle 102 can see the image. A guide object is displayed on the front display 104, as necessary. In the second embodiment that will be described below, as in the first embodiment, the guide object is an arrow indicating the exit direction at the guide branch point along the guide route, a guide image indicating the position and direction of the recommended lane in which the vehicle is recommended to travel on the road on which the vehicle is currently traveling in order for the vehicle to pass through the guide branch point along the guide route, and a guide image encouraging the vehicle occupant to move to the recommended lane.

When the occupant 106 sees the image displayed on the front display 104 using reflection on the windshield 105, the occupant 106 sees the image displayed on the front display 104 as a virtual image 110 at a distant position ahead of the windshield 105 rather than at the position of the windshield 105. The virtual image 110 is displayed superimposed on the surrounding environment (landscape, actual view) ahead of the vehicle. For example, the virtual image 110 can be displayed superimposed on any desired object located ahead of the vehicle (road surface, building, an object against which the vehicle occupant is to be warned or alerted).

The position where the virtual image 110 is generated, more specifically, the distance L from the occupant 106 to the virtual image 110 (hereinafter referred to as the "imaging distance L"), is determined by the position of the front display 104. For example, the imaging distance L is determined by the distance along the optical path from the position where the image is displayed on the front display 104 to the windshield 105 (optical path length). For example, the optical path length is set so that the imaging distance L is 1.5 m.

A front camera 111 is installed above the front bumper of the vehicle, on the back of the rearview mirror, etc. The front camera 111 is an imaging device with a camera using a solid-state imaging device such as CCD. The front camera 111 is installed with its optical axis extending forward in the direction of travel of the vehicle. For example, the situation of the environment ahead of the vehicle (i.e., the environment on which the virtual image 110 is superimposed) that is seen by the occupant 106 through the windshield 105 is detected by performing image processing on the image captured by the front camera 111. A sensor such as a millimeter-wave radar may be used instead of the front camera 111.

An in-vehicle camera 112 is installed on the upper surface of an instrument panel of the vehicle. The in-vehicle camera 112 is an imaging device with a camera using a solid-state imaging device such as CCD. The in-vehicle camera 112 is installed with its optical axis extending toward the driver's seat. The detection range (imaging range of the in-vehicle camera 112) is set to the range in which the occupant's face is typically expected to be located in the vehicle, and the in-vehicle camera 112 captures an image of the face of the occupant 106 sitting in the driver's seat. The positions of the eyes of the occupant 106 (the line-of-sight start position) and the gaze direction of the occupant 106 are detected by performing image processing on the image captured by the in-vehicle camera 112.

Figure 20:
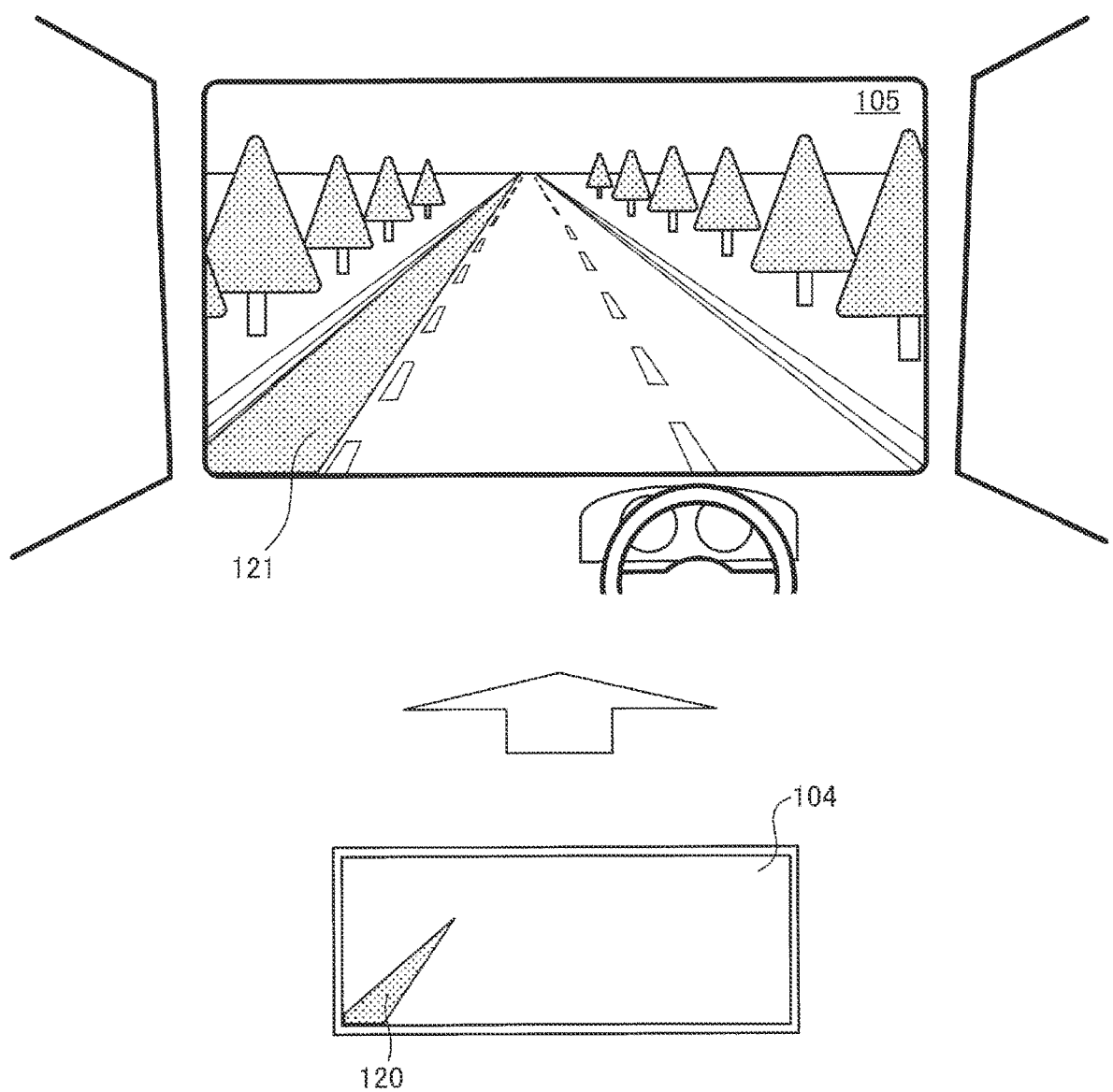
FIG. 20 shows a display example of a guide object in the superimposed image display device according to the second embodiment.

As shown in FIG. 20, the superimposed image display device according to the second embodiment displays an image 120 of a guide object on the front display 104 in S5 and S7 of the driving assistance processing program described above (FIG. 2). As the vehicle occupant sees the image 120 of the guide object displayed on the front display 104 as shown in FIG. 20, the vehicle occupant sees a virtual image 121 of the image 120 of the guide object superimposed on the landscape through the windshield 105.

Accordingly, as in the superimposed image display device according to the first embodiment, the vehicle occupant can be accurately aware of the position and orientation of the recommended lane and the exit direction at the guide branch point. In the superimposed image display device according to the second embodiment, the size and shape of the guide object to be displayed on the front display 104 and the position (range) where the guide object is to be displayed on the front display 104 are determined in the guide object display position determination process in S4 and S6. It is desirable that the current position and orientation of the vehicle that are identified in the three-dimensional space in S11 and S35 be the position of the occupant of the vehicle and the gaze direction of the occupant detected using the in-vehicle camera 112.

It is to be understood that the present disclosure is not limited to the above embodiments and various improvements and modifications can be made without departing from the spirit and scope of the present disclosure.

For example, in the first embodiment, the liquid crystal display 15 displaying an image of an actual view is used as a unit for displaying an image superimposed on the landscape around the vehicle. In the second embodiment, the head-up display system is used as a unit for displaying an image superimposed on the landscape around the vehicle. However, a windshield display (WSD) that displays an image on the windshield may be used. In the WSD, the windshield may be used as a screen to display an image from a projector, or the windshield may be a transmissive liquid crystal display. An image displayed on the windshield by the WSD is an image superimposed on the landscape around the vehicle.

In the first and second embodiments, when the confidence of the identification result of the vehicle's lane of travel is higher than the threshold, an image of a guide object distinguishing the recommended lane from the other lanes is displayed as guidance having high guiding capability to guide the vehicle to the recommended lane (S17 to S19). When the confidence is lower than the threshold, an image of a guide object indicating the direction toward the recommended lane is displayed as guidance having low guiding capability to guide the vehicle to the recommended lane (S21 to S23). However, how the manner in which guidance is provided is changed based on the confidence can be changed as appropriate. For example, the guide object may be displayed with a transmittance or color according to the confidence. Specifically, the higher the confidence is, the more visible to the user the transmittance or color of the guide object is made when displayed. For example, when the identification result of the vehicle's lane of travel is higher than the threshold, the guide object is displayed in a more visible color such as yellow or red, or is displayed with a low transmittance (e.g., 10%). On the other hand, when the confidence of the identification result of the vehicle's lane of travel is lower than the threshold, the guide object is displayed in a less visible color such as green or white or is displayed with a high transmittance (e.g., 80%).

In the first and second embodiments, the right-side confidence CR, the left-side confidence CL, and the overall confidence CT are calculated as the confidences for the identification result of the vehicle's lane of travel. However, not all of the right-side confidence CR, the left-side confidence CL, and the overall confidence CT need be calculated, and only one or two of them may be calculated. The right-side confidence and the left-side confidence are calculated based on whether the lane lines that are supposed to be present are correctly perceived (Expressions (1) to (7)). However, the right-side confidence and the left-side confidence may be calculated using the perception results of the road edges rather than the perception results of the lane lines. In Expressions (1) to (7) for calculation of the right-side confidence CR and the left-side confidence CL, each confidence is calculated using all of the following: whether any lane lines have been detected, the color of the detected lane lines, the type of the detected lane lines, and the tilt of the detected lane lines with respect to the direction of travel of the road. However, each confidence need not be calculated using all of them, and may be calculated using only a part of them.

In the first and second embodiments, the guide objects are the first guide objects 71 to 74 that provide guidance on the recommended lane of the vehicle and the second guide objects 81 to 83 that are arrows indicating the exit direction of the vehicle at the guide branch point located ahead in the direction of travel. However, only the first guide objects 71 to 74 may be used. The first guide objects 71 to 74 need not necessarily have a rectangular or triangular shape superimposed on the lane, and may have other shapes as long as they can indicate the position and orientation of the recommended lane.

In the first and second embodiments, the guide object is used to provide guidance on the guide branch point. However, the point whose guidance is to be provided by the guide object is not limited to the guide branch point. For example, guidance on the position and direction of the recommended lane may be provided using the guide object when the vehicle passes through a point where the number of lanes decreases or a merging section.

In the first embodiment, an image of an actual view captured by the front camera 19 and a guide object are displayed on the liquid crystal display 15 of the navigation device 1. However, the display that displays an image of an actual view and a guide object may be a display other than the liquid crystal display 15 as long as the display is placed inside the vehicle.

In the second embodiment, a virtual image is generated ahead of the windshield 105 of the vehicle 102 by the front display 104. However, a virtual image may be generated ahead of a window other than the windshield 105. An image from the front display 104 may be reflected on a visor (combiner) installed around the windshield 105, rather than on the windshield 105, or may be a wearable display such as an eyeglass or a display device.

In the first and second embodiments, the navigation ECU 13 of the navigation device 1 performs the processes of the driving assistance processing program (FIG. 2). However, the unit that performs the processes of the driving assistance processing program may be changed as appropriate. For example, a control unit of the liquid crystal display 15, a vehicle control ECU, or other on-vehicle equipment may perform the processes of the driving assistance processing program.

What is claimed is:

1. A superimposed image display device that is mounted on a vehicle and that superimposes a guide object providing guidance on information to an occupant of the vehicle on a landscape around the vehicle to allow the occupant to see the guide object, the superimposed image display device comprising:
   a display; and
   a processor, the processor configured to:
      acquire a recommended lane in which the vehicle is recommended to travel on a road on which the vehicle is currently traveling;

identify a lane of travel, the lane of travel being a lane in which the vehicle is currently traveling on the road on which the vehicle is currently traveling;

acquire a confidence indicating how confident an identification result of the lane of travel by the lane-of-travel identification unit is; and control the display to draw the guide object in a display mode according to the confidence, wherein the display displays the guide object providing guidance on the recommended lane in such a manner that the guide object is superimposed on a road surface, based on the identified lane of travel and the recommended lane.

2. The superimposed image display device according to claim 1, wherein as the confidence increases, the display displays the guide object in a display mode having higher guiding capability to guide the vehicle to the recommended lane.

3. The superimposed image display device according to claim 2, wherein the display displays an image indicating a direction toward the recommended lane as the guide object when the confidence is lower than a threshold, and displays an image distinguishing the recommended lane from other lanes as the guide object when the confidence is higher than the threshold.

4. The superimposed image display device according to claim 3, wherein the display displays an image superimposed on a road surface of the recommended lane as the image distinguishing the recommended lane from other lanes.

5. The superimposed image display device according to claim 2, wherein the display displays the guide object with a transmittance or color according to the confidence, and as the confidence increases, the display displays the guide object with a transmittance or color that is more visible to the occupant.

6. The superimposed image display device according to claim 1, wherein the processor:

detects lane lines around the vehicle and edges of the road on which the vehicle is currently traveling, based on an captured image of an area around the vehicle, estimates the number of lanes from the edge of the road to the lane in which the vehicle is currently traveling, based on a detection result of the lane lines and the edges of the road, and identifies the lane of travel based on a result of the estimation.

7. The superimposed image display device according to claim 1, wherein the confidence includes a right-side confidence and a left-side confidence, the right-side confidence being a confidence when a position of the lane of travel is identified with respect to a right edge of the road based on the detection result of the lane line and road edge located on a right side of the vehicle in a direction of travel of the vehicle, and the left-side confidence being a confidence when the position of the lane of travel is identified with respect to a left edge of the road based on the detection result of the lane line and road edge located on a left side of the vehicle in the direction of travel of the vehicle, and the display displays the guide object in a display mode according to an overall confidence calculated based on the right-side confidence and the left-side confidence.

8. The superimposed image display device according to claim 7, wherein the right-side confidence is calculated based on at least one of detection results obtained by detecting the lane line on the right side of the vehicle in the direction of travel by image recognition of the captured image of an area around the vehicle, the detection results being whether any lane line has been detected, a color of the detected lane line, the detected lane line is a solid line or dashed line, and a tilt of the detected lane line with respect to the direction of travel of the road, and the left-side confidence is calculated based on at least one of detection results obtained by detecting the lane line on the left side of the vehicle in the direction of travel by image recognition of the captured image of the area around the vehicle, the detection results being whether any lane line has been detected, a color of the detected lane line, the detected lane line is a solid line or dashed line, and a tilt of the detected lane line with respect to the direction of travel of the road.

9. The superimposed image display device according to claim 8, wherein the right-side confidence and the left-side confidence are calculated based more on the detection result of the lane line at a position far away from the vehicle than the detection result of the lane line at a position near the vehicle.

10. The superimposed image display device according to claim 1, wherein the processor acquires, as the recommended lane, a lane corresponding to an exit direction of the vehicle at a guide branch point when there is the guide branch point within a predetermined guidance start distance ahead in the direction of travel of the vehicle, the confidence includes a right-side confidence and a left-side confidence, the right-side confidence being a confidence when a position of the lane of travel is identified with respect to a right edge of the road based on the detection result of the lane line and road edge located on the right side of the vehicle in the direction of travel of the vehicle, and the left-side confidence being a confidence when the position of the lane of travel is identified with respect to a left edge of the road based on the detection result of the lane line and road edge located on the left side of the vehicle in the direction of travel of the vehicle, and the display displays the guide object in a display mode according to the confidence corresponding to the exit direction of the vehicle at the guide branch point out of the right-side confidence and the left-side confidence.

* * * * *